(12) United States Patent
Kanaya et al.

(10) Patent No.: US 7,275,551 B2
(45) Date of Patent: Oct. 2, 2007

(54) DEVICE FOR CLEANING FOOD WITH OZONE WATER, AND METHOD OF CLEANING FOOD USING CLEANING DEVICE

(75) Inventors: Takafumi Kanaya, Kobe (JP); Kazuhisa Okada, Kobe (JP); Koichi Yoshida, Kobe (JP)

(73) Assignee: Kabushiki Kaisha Kobe Seiko Sho, Kobe-shi (JP)

( * ) Notice: Subject to any disclaimer, the term of this patent is extended or adjusted under 35 U.S.C. 154(b) by 595 days.

(21) Appl. No.: 10/258,526

(22) PCT Filed: Apr. 12, 2001

(86) PCT No.: PCT/JP01/03177

§ 371 (c)(1),
(2), (4) Date: Jun. 30, 2003

(87) PCT Pub. No.: WO01/80669

PCT Pub. Date: Nov. 1, 2001

(65) Prior Publication Data

US 2004/0022908 A1    Feb. 5, 2004

(30) Foreign Application Priority Data

Apr. 25, 2000  (JP) .............................. 2000-128981
Feb. 20, 2001  (JP) .............................. 2001-27057

(51) Int. Cl.
  *B08B 3/00*   (2006.01)
  *B08B 3/06*   (2006.01)
(52) U.S. Cl. .................. 134/25.3; 134/32; 134/33; 134/65; 134/133; 134/134; 134/148; 134/153
(58) Field of Classification Search .............. 134/25.3, 134/65, 132, 133, 134, 140, 147, 148, 153, 134/157, 32, 33
See application file for complete search history.

(56) References Cited

U.S. PATENT DOCUMENTS 2,370,504 A * 2/1945 Hansen .................... 15/3.11

(Continued)

FOREIGN PATENT DOCUMENTS

JP        51-150285         5/1975

(Continued)

*Primary Examiner*—Michael Barr
*Assistant Examiner*—Saeed Chaudhry
(74) *Attorney, Agent, or Firm*—Oblon, Spivak, McClelland, Maier & Neustadt, P.C.

(57) ABSTRACT

A food washing apparatus of the invention includes an ozonized water generator (10), a cylindrical washing tank (1) in which the food materials are put and which can rotate to wash the food materials, a drainage part (4) formed at a part of the washing tank (1) and including openings to such a degree that water passes through and the food materials do not pass through, and wash water pipings (2, 9) which are inserted and disposed in the washing tank (1) in an axial direction and in which water spray holes (2a, 2a) for spraying wash water including at least ozonized water are formed, and while at least one part of the wash water sprayed from the wash water pipings (2, 9) is draind from the washing tank (1) every rotation of the washing tank (1), washing of the food materials is performed. Further, there is also a method in which a receiving tank (8) for wash water drained from the washing tank (1) is provided, and at least one part of the wash water in the receiving tank (8) is returned to an inlet side of the ozonized water generator (10) to perform cyclic use of the wash water.

57 Claims, 9 Drawing Sheets

U.S. PATENT DOCUMENTS

| | | | |
|---|---|---|---|
| 4,073,301 A | * | 2/1978 | Mackinnon .................. 134/65 |
| 5,173,122 A | * | 12/1992 | Tilby et al. .................... 127/2 |
| 5,203,972 A | * | 4/1993 | Shimamune et al. ....... 205/626 |
| 5,498,295 A | * | 3/1996 | Murch et al. .................. 134/6 |
| 5,580,394 A | * | 12/1996 | Freytag ....................... 134/10 |
| 6,328,044 B1 | * | 12/2001 | Crisinel et al. ............ 134/25.3 |

FOREIGN PATENT DOCUMENTS

| | | | |
|---|---|---|---|
| JP | 54-86686 | | 7/1979 |
| JP | 64-2564 | | 1/1989 |
| JP | 64-9592 | | 1/1989 |
| JP | 08-134677 | * | 5/1996 |
| JP | 10-136957 | | 5/1998 |
| JP | 10-313842 | | 12/1998 |
| JP | 11-113546 | | 4/1999 |
| JP | 11-290049 | | 10/1999 |

\* cited by examiner

FRONT HALF PORTION

REAR HALF PORTION

DEVICE FOR CLEANING FOOD WITH OZONE WATER, AND METHOD OF CLEANING FOOD USING CLEANING DEVICE

TECHNICAL FIELD

The present invention relates to a food materials washing apparatus which performs effective sterilization and washing of vegetables to be eaten raw, or grains, tubers, or seeds (including ones for gardening and for farming) or nuts etc. (hereinafter simply abbreviated to "food materials"), and a washing method using the apparatus.

BACKGROUND ART

Conventionally, a method of cutting vegetables to be eaten raw into predetermined sizes and transporting or selling them has been carried out. This method is carried out when vegetables for salad to be eaten raw are cut into predetermined sizes, are divided into small pieces for single persons, are packed and are sold, or vegetables cut in a processing plant are transported to related restaurants. In recent years, the demand tends to increase. Besides, needs for a treatment of enabling the long preservation of grains, tubers, or seeds or nuts, or a treatment of performing washing and sterilization when they are processed as food, are also increased.

Particularly, for vegetables to be eaten raw, such as salad vegetables, washing is performed and a sterilization treatment is performed in order to prevent a change in quality or decomposition until they are eaten. For this, there is also a method in which a washing step by clean water and a sterilization step using a chemical agent are independently performed in separate work places. However, recently, as a rational method in which such washing and sterilization are performed at the same time, a method of using ozonized water is proposed. As this method, there is a revolving current method disclosed in Japanese Patent Laid-Open No. 19376/1997. That is, this is a method in which stored water in a washing tank into which vegetables are put is circulated by a circulation pump to generate a revolving current in the washing tank, and an ozone-containing gas generated by an ozone generator is blown into the washing tank. By this, bacteria stuck on the vegetables are sterilized, and at the same time, pollutants such as agricultural chemicals are also removed, and moisture is supplied to cells of the vegetables to revive freshness. As another method, there is a method disclosed in Japanese Patent Laid-Open No. 290049/1999. In this method, after vegetables are received in a space of a sealed type chamber, low concentration ozonized water is poured to such a degree that the vegetables are not soaked. Stored ozonized water is circulated and jetted to the vegetables. By this, washing and sterilization of the vegetables are performed under a mixture atmosphere of gaseous ozone and ozonized water.

In the conventional methods, first, in the revolving current method disclosed in Japanese Patent Laid-Open No. 19376/1997, even if air containing ozone is blown into the washing tank, before the ozone dissolves, most of it passes through the washing tank without stopping and is diffused into the atmosphere. Thus, there has been a problem in a sterilization effect by ozone.

On the other hand, in the method disclosed in Japanese Patent Laid-Open No. 290049/1999, the ozonized water is water stored in the sealed container, and this stored water is cyclically used as wash water. As compared with the former, although an improvement in the sterilization effect by ozone can be expected, gradual contamination of the wash water can not be avoided. Thus, after washing by the ozonized water, it is necessary to perform a step of, for example, performing washing by clear water such as tap water, Further, since both are of a batch type in which vegetables are put into the container and are washed, they are unsuitable methods as a continuous method applied to an apparatus for continuously washing plenty of vegetables.

In view of such circumstances, the invention has an object to provide a method in which a large amount of food materials can be always continuously washed and sterilized by fresh ozonized water, and which uses a small quantity of water and is economical.

DISCLOSURE OF THE INVENTION

The invention has been made in view of the above, and a washing apparatus of the invention comprises an ozonized water generator, a cylindrical washing tank in which food materials are put and which can rotate to wash the food materials, a drainage part formed at a part of the washing tank and including a large number of openings to such a degree that water passes through and the food materials do not pass through, and a wash water piping which is inserted and disposed in the washing tank in an axial direction and in which a water spray hole for spraying wash water including at least ozonized water generated by the ozonized water generator into the washing tank is formed, and is characterized in that while at least part of the wash water sprayed from the wash water piping is drained from the washing tank every rotation of the washing tank, washing of the food materials is performed.

Besides, the above apparatus is provided with a receiving tank for the wash water drained from the washing tank and a wash water return current piping for returning at least one part of the wash water in the receiving tank to an inlet side of the ozonized water generator. By this, at least the part of the wash water drained from the washing tank is returned to the materials water inlet side of the ozonized water generator and is cyclically used, so that water consumption can be greatly reduced.

Besides, an inlet for the food materials is formed at one end of the washing tank, a drain port is formed at the other end, and a spiral member is formed inside the washing tank. By this, the food materials put in the washing tank can be washed while they are conveyed to the drain port from a side of the inlet with the rotation of the washing tank, and a continuous massive treatment of food materials becomes easy. Incidentally, as the spiral member, there are a continuous one and a discontinuous one, and both can be adopted.

Besides, it is preferable that the drainage part of the washing tank is formed to be continuous in a longitudinal direction of the washing tank, and by this, it becomes possible to renew all of the wash water every rotation. Besides, in order to facilitate drainage from the drainage part, it is preferable to form the drainage part out of a wire net or a porous metal plate. Further, in order to facilitate the transfer of the food materials in the washing tank, it is preferable to obliquely dispose the washing tank so that a falling gradient is realized from the side of the inlet to the side of the drain port. Incidentally, it is also possible to reduce the amount of wash water supply by forming the drainage part intermittently in the longitudinal direction of the washing tank and by forming a draining portion and a staying portion.

Besides, it is preferable that a sectional shape of the washing tank is a circle, an ellipse, or a polygonal, and especially a regular hexagon is optimum in that manufacture is easy and a suitable depth of the staying wash water can be secured.

Further, in a preferable embodiment, the wash water piping is made rotatable, and by this, a water spray angle of the wash water piping is made variable in accordance with the size, shape and the like of the food materials.

Besides, a method is also effective in which the washing tank is constructed so that normal and reverse rotations can be made, and it is suitably rotated normally or reversely in a state where the wash water is stored in the inside, so that the washing effect of food materials is raised by a swing action of the washing tank, and the amount of wash water used is reduced.

Besides, the wash water piping is constituted by a first wash water piping including a water spray hole in a front half portion of the washing tank and a second wash water piping including a water spray hole in a rear half portion, and one of ozonized water and clean water is enabled to flow to both the wash water pipings by a changeover operation of valves. Especially, a preferable method is a method in which as the ozonized water generator, an electrolytic ozonized water generator is adopted in which ozonized water is generated at an anode side by electrolysis of water, and alkaline water is generated at a cathode side, and the ozonized water or the alkaline water, or clean water is enabled to flow to both the wash water pipings by the changeover operation of the valves. In this case, it becomes possible to use the alkaline water for the degreasing washing of the food materials or the degreasing washing of the washing tank itself.

Besides, the receiving tank for the drain wash water is constituted by a front receiving tank for wash water drained from the front half portion of the washing tank, and a rear receiving tank for wash water drained from the rear half portion. Then, at least one part of the drain wash water in the rear receiving tank is enabled to be supplied to an inlet side of the first wash water piping. By this, it becomes possible to reuse the ozonized water used in the rear half portion in the front half portion.

Further, a method in which at least one part of the drain wash water in the rear receiving tank is returned to the inlet side of the ozonized water generator, or a method in which at least one part of the drain wash water in the front receiving tank is returned to the inlet side of the ozonized water generator is also a preferable method which is expected to have a great effect in reduction of the amount of clean water used for the washing of the food materials.

Incidentally, an ozonized water tank for storing the ozonized water generated by the ozonized water generator is provided, and the second wash water piping (ozonized water piping) is connected to both the ozonized water tank and the ozonized water generator, and when supply of the ozonized water from both is enabled, a flexible change can be made in the amount of ozonized water supply in accordance with a change of the amount of ozonized water demanded.

Besides, it is preferable that the washing tank has a structure that unit cylindrical bodies in each of which a spiral member is formed along an inner wall are coupled to each other so as to be separable. By this, the disassembly and washing of the washing tank is simplified.

Next, a food materials washing method using the above washing apparatus is characterized in that food materials are put in from an inlet disposed at one end of a cylindrical washing tank, the food materials are drained from a drain port formed at the other end of the washing tank by rotating the washing tank, ozonized water is sprayed from a wash water piping disposed in the washing tank in an axial direction, the sprayed ozonized water is drained by rotation of the washing tank through a drainage part formed in the washing tank and including an opening to such a degree that water passes through and the food materials do not pass through, whereby while at least one part of the ozonized water sprayed from the wash water piping is drained from the drainage part of the washing tank every rotation of the washing tank, washing and transfer of the food materials are performed.

Besides, there is also a method in which at least one part of the ozonized water drained from the washing tank is returned to a materials water inlet side of the ozonized water generator, and the drained ozonized water is cyclically used, so that water consumption can be greatly reduced.

Also in these methods, a first wash water piping having a water spray hole in a front half portion of the washing tank and a second wash water piping having a water spray hole in a rear half portion are used as the wash water piping. Then, as set forth above, it is also a preferable method to spray the drain wash water, which was sprayed to the rear half portion of the washing tank and drained from the second wash water piping, to the front half portion of the washing tank through the first wash water piping, or to return the drain ozonized water drained from the front half portion to the materials water inlet side of the ozonized water generator. Besides, the ozonized water is ozonized water generated at an anode side by an electrolysis method of water. It is also a preferable mode that one of the ozonized water, alkaline water generated at a cathode side by the electrolysis method, and clean water is enabled to flow to the first wash water piping and the second wash water piping by a changeover operation of valves.

Especially, in the case where the electrolytic ozonized water generator is used, it becomes possible to adopt a washing method including following processes by changing over and using the ozonized water, the alkaline water, and the clean water.

A process: "washing tank before-washing process" in which while the alkaline water generated at the cathode side by the electrolysis method or the clean water is sprayed from one of or both of the first and the second wash water pipings, before-washing of the washing tank itself is performed.

B process: "food materials washing process" in which the food materials are put in from the inlet while the washing tank is rotated, and water spray of the ozonized water is performed from at least the second wash water piping, so that while at least one part of the sprayed ozonized water is drained every rotation of the washing tank, the food materials are conveyed in the washing tank, and washing and sterilization of the food materials are performed.

C process: "after-washing process of washing tank" in which after completion of the food materials washing process, while the alkaline water or the clean water is sprayed from one of or both of the first and the second wash water pipings, after-washing of the washing tank itself is performed.

Besides, as the A process, it is preferable to select a process including at least one of following A1 step to A3 step.

A1 step: "washing tank alkaline water before-washing step" in which the alkaline water is supplied to both the first and the second wash water pipings to perform alkaline water washing of the washing tank.

A2 step: "washing tank water before-washing step" in which the clean water is supplied to both the first and the second wash water pipings to perform water washing of the washing tank.

A3 step: "washing tank alkaline water and water before-washing step" in which the A2 step is performed after the A1 step is performed.

Besides, as the B process, it is preferable to select a process including at least one of following B1 step to B3 step.

B1 step: "food materials before-washing and washing step" in which the clean water is sprayed from the first wash water piping in the front half portion of the washing tank, and the ozonized water is sprayed from the second wash water piping in the rear half portion of the washing tank.

B2 step: "food materials degreasing and washing step" in which the alkaline water is sprayed from the first wash water piping in the front half portion of the washing tank.

B3 step: "food materials ozonized water washing step" in which the ozonized water is sprayed from the second wash water piping into the rear half portion of the washing tank, and the ozonized water is sprayed from the first wash water piping into the front half portion as well.

Besides, as the C process, it is preferable to select at least one of following C1 step to C3 step.

C1 step: "alkaline water after-washing step of washing tank" in which the alkaline water is supplied to both the first and the second wash water pipings to perform alkaline water washing of the washing tank.

C2 step: "water after-washing step of washing tank" in which the clean water is supplied to both the first and the second wash water pipings to perform water washing of the washing tank.

C3 step: "Alkaline water and water after-washing step of washing tank" in which the C2 step is performed after the C1 step is performed.

Incidentally, as a reuse method of the wash water, there is "ozonized water recycling" in which in the B3 step, the drain ozonized water drained from the rear half portion of the washing tank is supplied to the first wash water piping and is sprayed from the first wash water piping to the front half portion of the washing tank, or "wash water return method" in which at least one part of the drain wash water from the washing tank in any one of the A process to the C process is returned to the materials water inlet port of the ozonized water generator.

Besides, also in these methods, in a state where the wash water sprayed into the washing tank is stayed, a rotation direction changeover operation is performed at least one time in which a rotation direction of the washing tank is reversed and is next normally rotated, so that a staying time is prolonged, a water level of the wash water is made deep, And a contact time between the food materials and the wash water is prolonged, and whereby efficiency of washing and sterilization of the food materials can be improved and the amount of wash water used can be reduced by the effective use of the wash water. Incidentally, it is preferable that the rotation speed is adjusted so that the rotation speed of the washing tank at the time of the swing operation becomes faster than the rotation speed at the time of non-swing.

Further, it is also a preferable method that the spiral member is disposed in the washing tank to perform transfer of the food materials smoothly.

BRIEF DESCRIPTION OF THE DRAWINGS

FIG. 3(a) is a sectional view of a washing tank front half portion, and FIG. 3(b) is a sectional view of a rear half portion.

FIG. 6(a) shows a state in which a major axis direction is vertical, and FIG. 6(b) shows a state in which it is horizontal.

BEST MODE FOR CARRYING OUT THE INVENTION

Outline of Washing Apparatus

Figure 1:
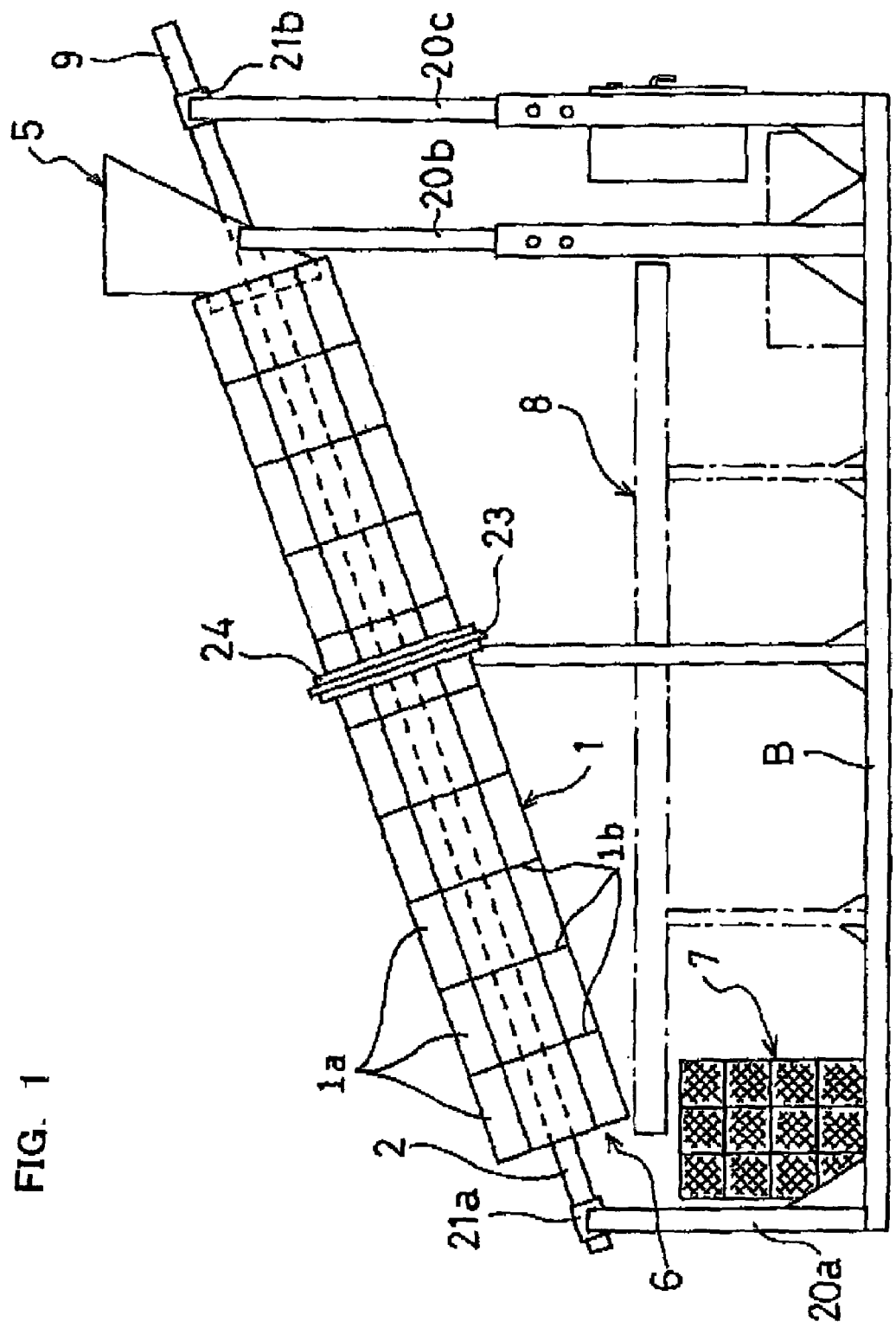
FIG. 1 is a side view showing an embodiment of a food materials washing apparatus according to the invention.
Figure 2:
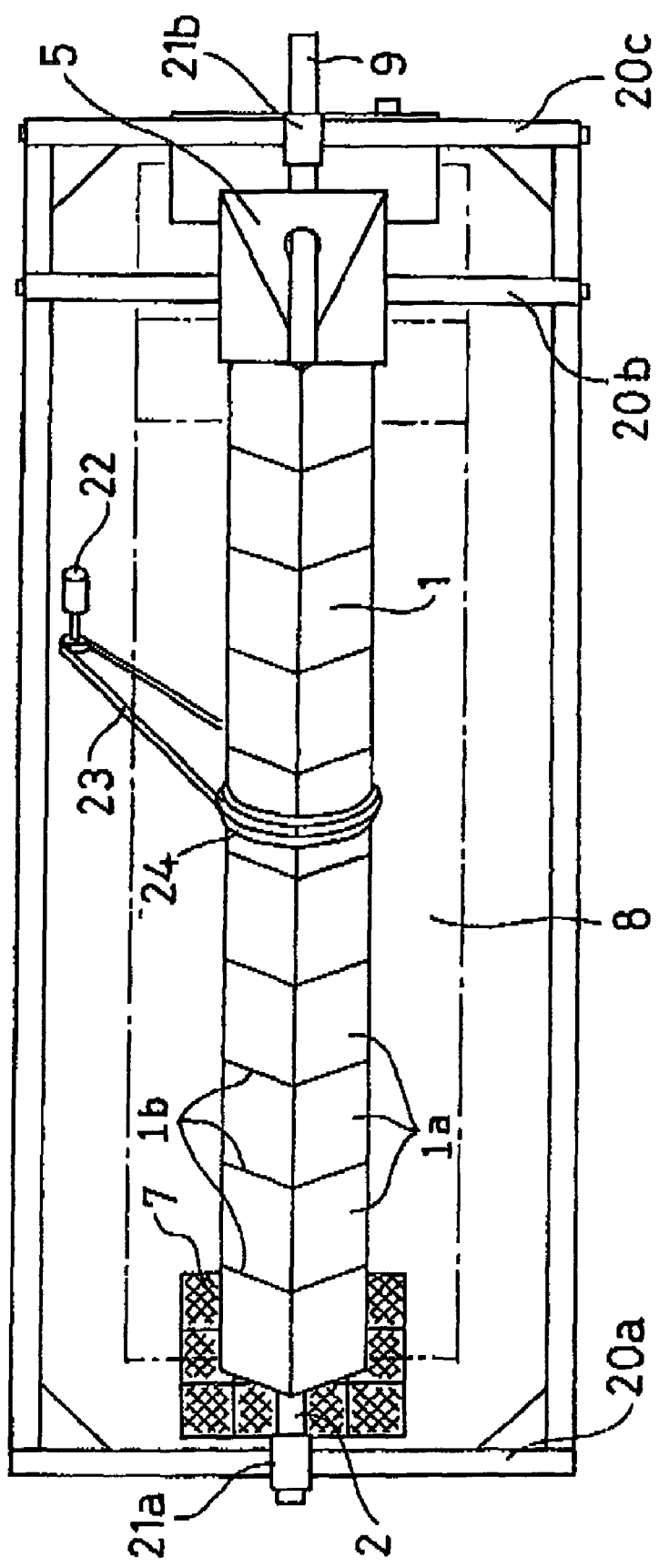
FIG. 2 is a plan view of FIG. 1.
Figure 3:
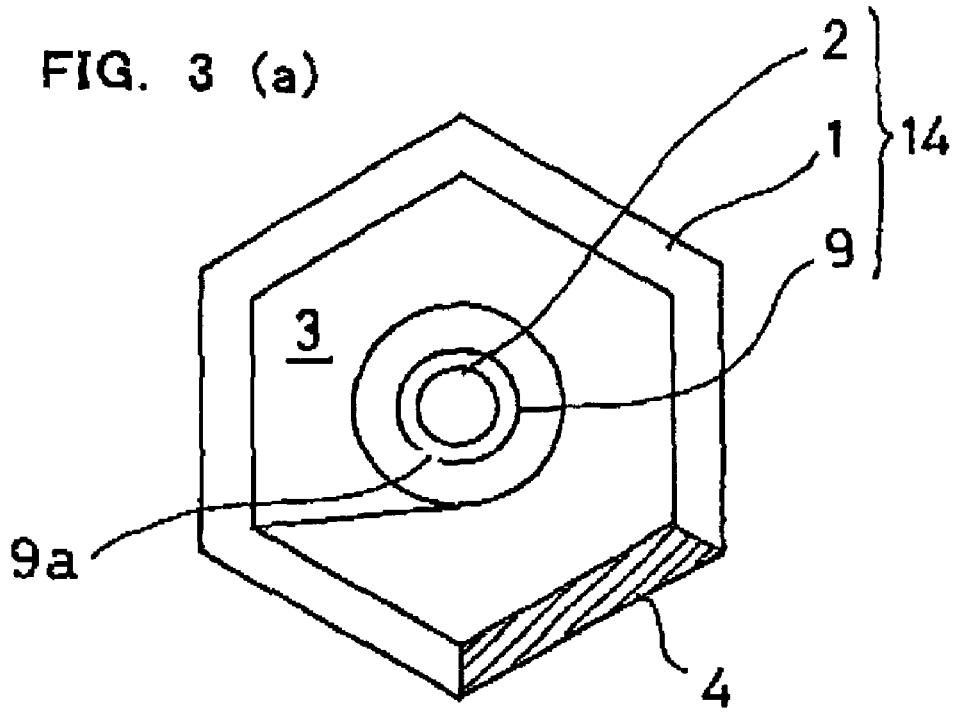
FIG. 3 is a main part sectional view of a washing tank of FIG. 1.
Figure 3:
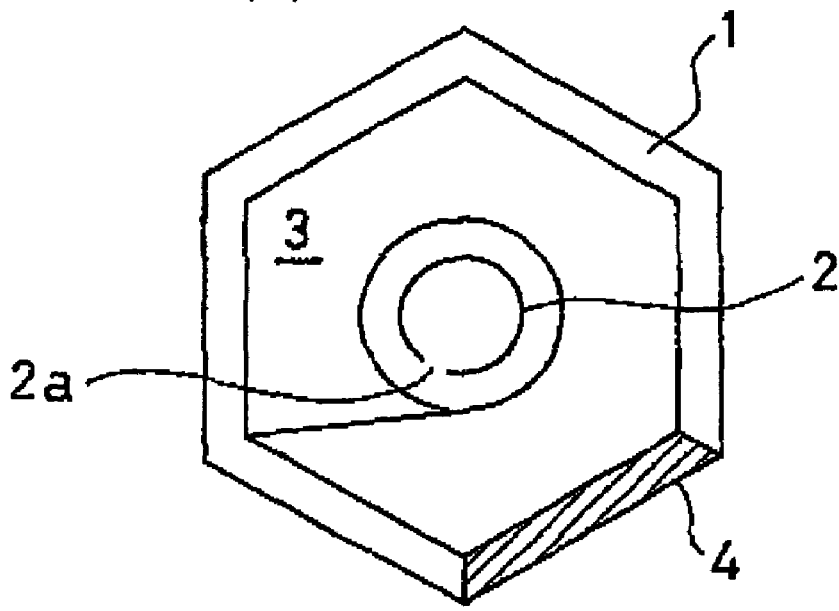

Hereinafter, the present invention will be described in detail with reference to the drawings. FIG. 1 is a side view showing a food materials washing apparatus according to the invention, FIG. 2 is its plan view, FIG. 3 is a sectional view of a washing tank shown in FIGS. 1 and 2, FIG. 3(a) is a sectional view of a front half portion, and FIG. 3(b) is a sectional view of a rear half portion.

In these drawings, a sectional shape of a washing tank i is a regular hexagon as shown in FIG. 3(a) and FIG. 3(b). A drainage part 4 is provided at one side of six sides. A large number of openings are disposed in this drainage part 4. The openings have such a degree of size that food materials do not pass through and water passes through. The drainage part 4 is formed of a wire net, a porous plate or the like disposed in a longitudinal direction of the washing tank 1. After-mentioned spiral members 3 are disposed along the inner surface in the washing tank 1.

Besides, a double pipe 14 is disposed substantially at the center of a front half portion of the washing tank 1 in an axial direction. The double pipe 14 is formed of an inner pipe as a second wash water piping 2 and an outer pipe as a first wash water piping 9. The second wash water piping 2 is disposed over the whole length of the washing tank 1 in the axial direction. The first wash water outer pipe 9 is formed only in the front half portion of the washing tank 1. Besides, water spray holes 2a are formed only in a portion of the second wash water piping 2 corresponding to the rear half portion of the washing tank 1. Water spray holes 9a are formed only in a portion of the first wash water piping 9 corresponding to the front half portion of the washing tank.

The washing tank 1 used in the invention is a long cylinder formed by coupling unit cylinders 1a, 1a, . . . to be separable at coupled faces 1b, 1b, . . . The spiral members are formed along the inner walls of the unit cylinders 1a, 1a, . . . This is based on such consideration that the unit cylinders can be divided and immersed in hot water in the case where heat sterilization of the washing tank 1 under obligation by food sanitation law is performed. An inlet 5 for food materials is formed at an input side of the washing tank 1, and an outlet 6 is formed at output side. A receiving basket 7 formed of a wire net or the like is disposed below the outlet 6 as a receptacle for the food materials output. Besides, the second and the first wash water pipings 2 and 9 are disposed at the center of the inside of the washing tank 1 to pass through in the longitudinal direction. Incidentally, the washing tank 1 is rotatably held through a not-shown bearing member with respect to the second and the first wash water pipings 2 and 9. Besides, both end parts of the through pipings are rotatably supported to support members 20*a* and 20*c* by bearing members 21*a* and 21*b*. The support members 20*a* and 20*c* are provided upright on a base B. Besides, the beating members 21*a* and 21*b* are respectively held to the support members 20*a* and 20*c* rotatably in the up-and-down direction. Two support members 20*b* and 20*c* at the side of the inlet 5 of the washing tank 1 can be respectively extended or contracted in the up-and-down direction. By this, it is obliquely disposed so that the portion on the side of the food materials inlet 5 of the washing tank 1 is high and the portion on the side of the outlet 6 is low. Incidentally, the support member 20*b* is a member for holding the food materials inlet 5 from below. The support member 20*b* and the food materials inlet 5 are rotatably coupled through a bracket (not shown) or the like. Incidentally, the inlet 5 portion is a body separatable from the washing tank 1. An end of the inlet 5 portion is fitted into a tip opening of the washing tank 1 and is disposed.

Besides, a ring member 24 is disposed around the outer peripheral surface of a body of the washing tank 1. The washing tank 1 can be rotated by a belt 23 stretched between the ring member 24 and a drive motor 22. Incidentally, reference numeral 8 in the drawing denotes a receiving tank for drain wash water disposed just under the washing tank 1. This is for temporarily storing the wash water drained from the drainage part 4 of the washing tank 1. There is a case where the wash water in the receiving tank is cyclically used as described later.

Figure 4:
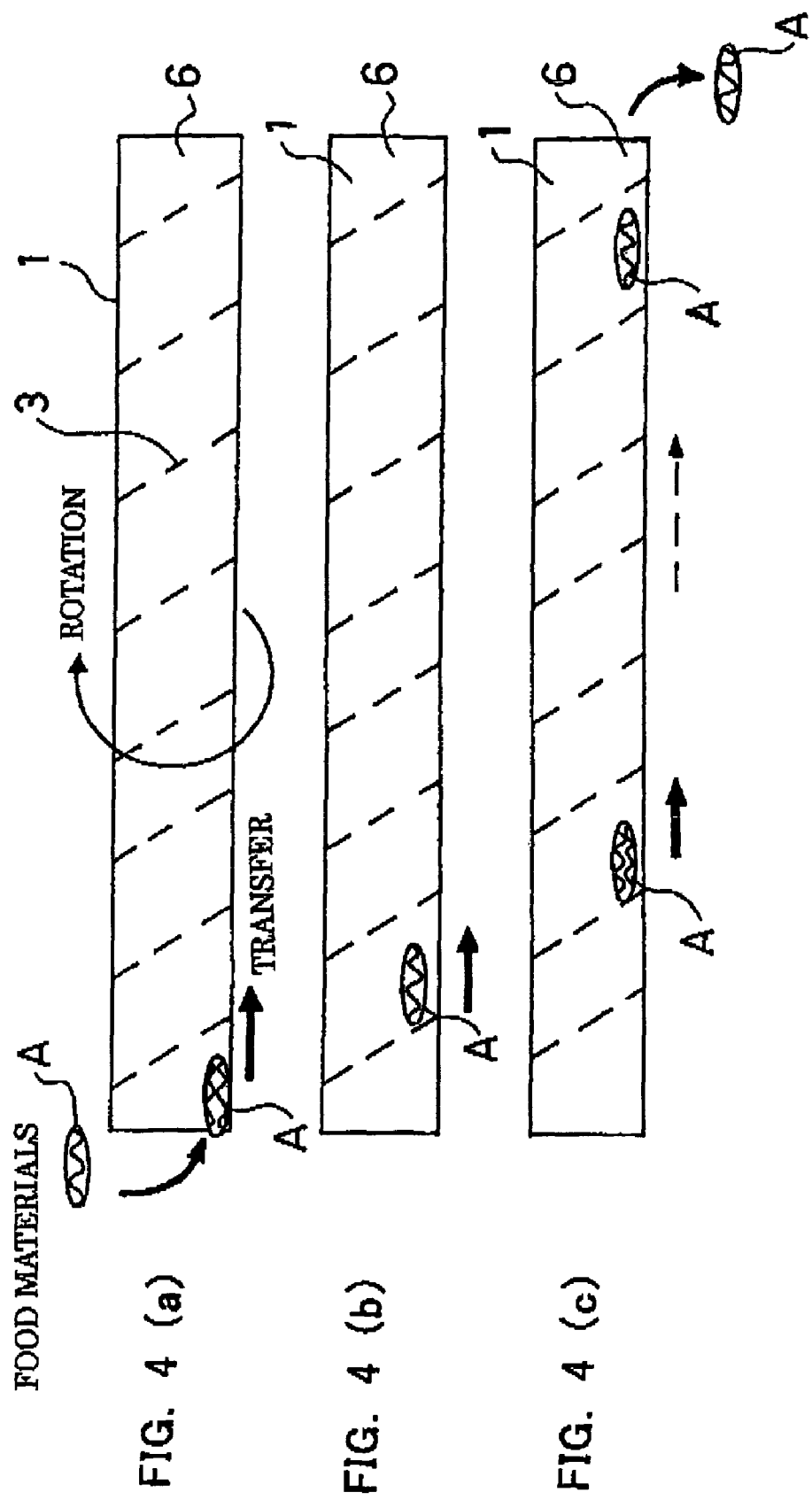
FIG. 4 is a conceptual view showing a washing process of food materials by the washing apparatus of FIG. 1.

Next, FIG. 4 is a drawing conceptually showing a transfer process of food materials by the rotation of the washing tank 1, which is one of the features of the invention. FIG. 4 (*a*) shows a state where food materials A are put in the washing tank 1 from the food materials inlet. The put food materials A are sequentially sent to the side of the outlet 6 by the spiral members 3 as shown in FIGS. 4(*b*) and 4(*c*). Then, the food materials A drop downward from the outlet 6 then are output. The spiral members 3 are disposed along the inner wall of the washing tank 1. Accordingly, the food materials A are sent from the inlet side to the outlet side by the rotation of the washing tank 1 and by the spiral members 3. Thus, it is not necessarily indispensable to obliquely dispose the washing tank 1 with a falling gradient from the inlet side to the outlet side as shown in FIG. 1.

Washing Tank and Washing Method

Figure 5:
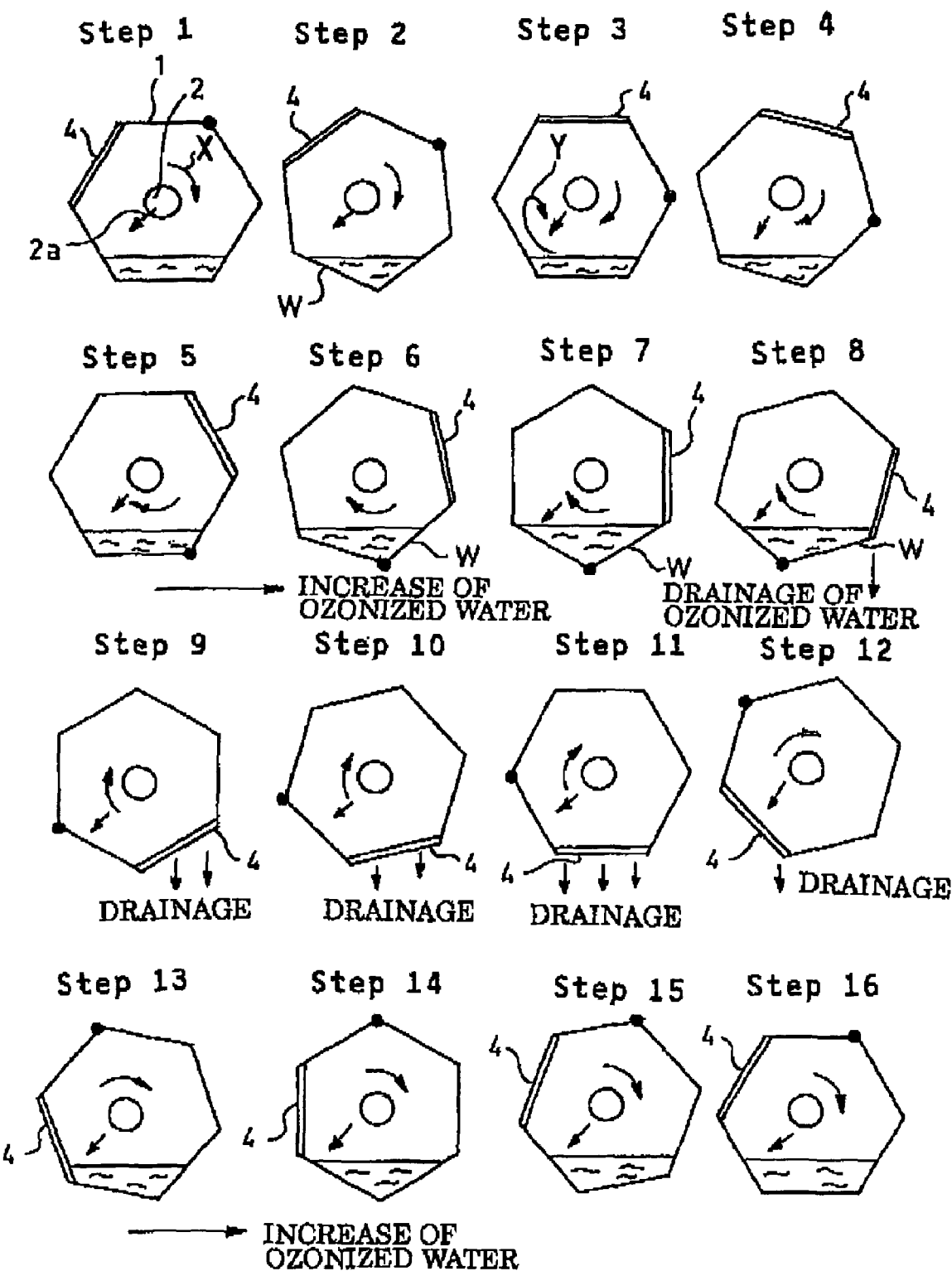
FIG. 5 is a process view showing temporal changes of staying and drain of ozonized water in a washing tank of FIG. 1.

Next, FIG. 5 is a process view of the embodiment of the invention. FIG. 5 shows a state of storage and drain of the wash water (ozonized water) by the rotation of the washing tank 1, which is another feature of the invention. In the drawing, one side of the washing tank 1 indicated by double lines denotes the drainage part 4 formed of the above-mentioned wire net or the like. In Step 1 of the drawing, the washing tank 1 is rotated in a clockwise direction as indicated by an arrow (X). The ozonized water is always sprayed from the water spray hole 2*a* of the wash water piping (the drawing shows the second wash water piping 2). The washing tank 1 is rotated from this state, and when a state occurs in which one apex of the hexagon is positioned down as shown in Step 2, the ozonized water W which has been sprayed up to that time is collected in the apex part and its depth increases. However, further, as shown in Step 3, when one side of the hexagon is positioned down, the ozonized water W comes to have an inverted trapezoid shape with the one side as the bottom, and the depth becomes shallow. In the process of the rotation of the washing tank 1, the food materials (not shown) are raised upward according to the rotation of the washing tank 1 and drop as indicated by an arrow (Y) in the drawing. The food materials repeat such movement. Thus, all surfaces of the food materials are apt to receive the water spray of fresh ozonized water. Similarly, when the rotation of the washing tank 1 proceeds from Step 4 to Step 7 in the drawing, ozonized water sprayed in this process is gradually accumulated. The depth gradually becomes deep. At the same time, it is gradually contaminated by the washing of the food materials.

Next, when a state of Step 8 in the drawing occurs, the ozonized water W stored in the washing tank 1 comes in contact with the drainage part 4 of the washing tank 1. From this point of time, drainage of the stored ozonized water W from the drainage part 4 is started. Between Step 9 and step 12 in the drawing, since the drainage part 4 is positioned down, the sprayed ozonized water is also drained, and the storage of the ozonized water does not occur. However, at the same time, this step is a step in which the surface of the food materials on which the contaminated ozonized water is stuck is washed by fresh ozonized water and the ozonized water is drained. Next, Steps 13 to 16 show a process for washing the food materials while the ozonized water W is again stored in the washing tank 1.

As stated above, in this embodiment, replacement of ozonized water is performed every rotation of the washing tank 1. As a result, the following effects are obtained. In the state where the drainage part 4 is positioned down, when the ozonized water which has been stored up to that time and is contaminated by the washing of the food materials is drained, and at the same time, by the constantly sprayed ozonized water, the surface of the food materials on which the contaminated ozonized water is stuck is washed by the fresh ozonized water.

Incidentally, it is preferable that a water spray angle of the ozonized water is adjustable. Since the water spray angle of the ozonized water is determined by the formation position of the water spray holes 2*a* of the wash water piping 2, the wash water piping 2 is made rotatable in order to make the water spray angle variable. By this, while a position in the washing tank 1 to which water should be sprayed is checked in accordance with the kind, size or input amount of food materials, it becomes possible to adjust the water spray angle by rotating the wash water piping 2.

The above description relates to an example of a case where the washing tank 1 is rotated in only one direction. In FIG. 5, the states of Step 1 to Step 5 show the process in which the washing tank 1 is rotated by 120° so that the drainage part 4 is moved from the upper left position to the upper right position. During this, although the ozonized water is stored, it is not drained. Then, when the state of the Step 1 reaches the state of Step 5, the rotation direction of the washing tank 1 is changed over from the normal rotation to the reverse rotation, and the reverse rotation is performed like Step 5→step 4 . . . →Step 1. Then, when the state again reaches the state of Step 1, the rotation direction is again returned to the normal rotation, and the rotation is performed from Step 1 to Step 5. As stated above, it is also possible to perform the washing while the storage amount of the ozonized water W is increased. In the reverse rotation step of the washing tank 1, the food materials and the ozonized water are swung by swinging the washing tank 1, the ozonized water covering the surfaces of the food materials is renewed, and the washing sterilization effect is raised. Therefore, it is preferable to provide the reverse rotation step of the washing tank 1.

Incidentally, the number of times of normal and reverse rotations of the washing tank 1, the swing angle, and the rotation speed at the time of the swing are arbitrarily selected. It is preferable that the number of swings is roughly not less than one and not larger than three. If larger than this, there is a fear that a harmful effect of a drop in throughput becomes more serious than an increase in washing effect. Besides, it is preferable that the swing angle is approximately not less than 100° and not higher than 150°, and is especially approximately 120°. Further, the rotation speed of the washing tank 1 at the time of the swing may be the same as the normal rotation speed. However, in order to raise the washing effect by swinging the inner ozonized water and food materials, it is preferable to make the rotation speed higher than the normal rotation speed, By the existence of the changeover operation of the rotation direction and by suitably setting the number of times of changeover and the rotation speed at the time of the swing, it becomes possible to adjust a contact time in relation to the ozonized water and to adjust the depth of the ozonized water stayed in the washing tank in accordance with the amount and size of the food materials. By this, wasteful spray of the ozonized water is prevented, and the amount of ozonized water strayed can be adjusted to an optimum state.

Figure 6:
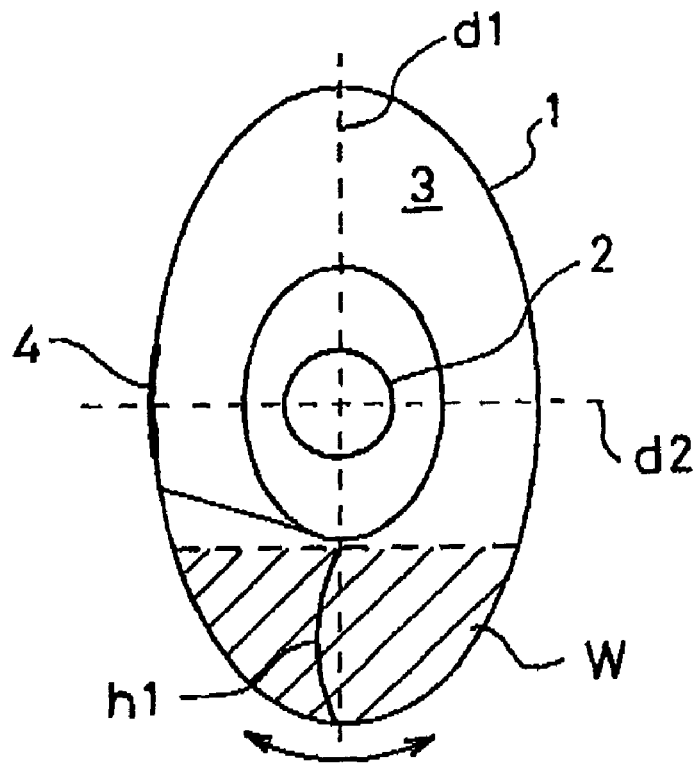
FIG. 6 is a main part sectional view showing an example of a washing tank having an elliptical section according-to the invention.
Figure 6:
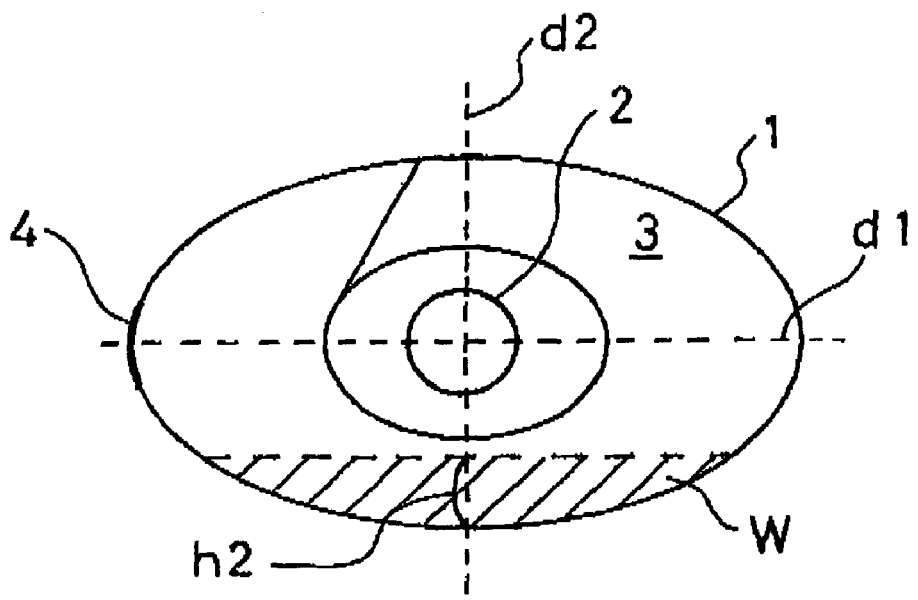

Besides, although the foregoing embodiment shows that the shape of the washing tank 1 is a regular hexagon in section, another shape may be adopted. FIG. 6 shows an example of a case where the section is elliptical. The same drawing (a) shows a state where the washing tank 1 is rotated aid a major diameter direction d1 of an ellipse is positioned in the vertical direction, and the same drawing (b) shows a state where a minor diameter direction d2 of the ellipse is positioned in the vertical direction. As is apparent from these drawings, the depth h of the stayed ozonized water W is different between the case (a) where the major diameter method d1 is in the vertical position and the case (b) where it is in the horizontal position. In the case (a) where the major diameter method d1 is in the vertical position, a water depth h1 becomes deep, and in the case where the minor diameter method d2 is in the vertical position, a water depth h2 becomes shallow. Accordingly, in the state of the same drawing (a), the food materials are immersed in the ozonized water deeply and narrowly, and in the state of the same drawing (b), they are immersed in the ozonized water shallowly and widely. By this repetition, all the food materials are uniformly washed. Incidentally, the swing operation may be performed in either of the state of the same drawing (a) and the state of the same drawing (b). However, in the case where the swing operation is performed in the state of the same drawing (a), the drainage part 4 must be provided at the position shown in the same drawing (a). In the case where the swing operation is performed in the state of the same drawing (b), the drainage part 4 must be provided at the position shown in the same drawing (b).

The sectional shape of the washing tank 1 may be, in addition to the foregoing regular hexagon and the ellipse, a circle or a polygonal shape such as a regular triangle, a square, a rectangle, or a regular octagon. However, from the viewpoint of ease of manufacture and ease of realization of a suitable water depth, it is preferable that the section is the ellipse in addition to the regular hexagon.

Next, with respect to the drainage part 4, in the foregoing embodiment, a porous member such as a wire net is disposed on the whole of one surface of the hexagonal cylinder in the longitudinal direction of the washing tank. However, with respect to the drainage part 4, there are various modified examples. For example, the drainage part 4 is intermittently formed on one surface of the hexagonal cylinder in the longitudinal direction of the washing tank. The drainage parts 4 are formed like stepping-stones with suitable spaces on the respective surfaces of the hexagonal cylinder, In the former case, in the section where the drainage part is formed, drainage of the ozonized water is performed by one rotation of the washing tank. However, in the section where the drainage part is not formed, the drainage of the ozonized water is not performed. Flowing of the ozonized water occurs from the section having no drainage part to the section having the drainage part. Washing of the food materials is continued through the decrease of the ozonized water by this flowing and newly sprayed ozonized water. On the other hand, in the latter case, since the drainage parts are intermittently formed on the respective surfaces of the hexagon, the drainage of the ozonized water is performed at any rotation angle. As a result, flowing of the ozonized water occurs from the section where the drainage part is positioned upper toward the section where the drainage part is positioned lower then drainage of the ozonized water is performed, and at the same time, supply of new ozonized water by spray of ozonized water is also performed. Thus, washing of the food materials is continued by mixture water of the stayed ozonized water and the new ozonized water. In any of these methods, in an arbitrary section of the washing tank 1, the respective Steps of FIG. 5 are carried out, and there is no problem in the washing effect. However, from the viewpoint of manufacture of the washing tank, it is preferable to form a continuous drainage part on one specified surface of the washing tank 1.

Electrolytic Ozonized Water Generator

Next, as the ozonized water generator used in the invention, for example, an apparatus in which an ozone gas is dissolved in water to generate the ozonized water can be adopted. However, as described later, in view of the merits that secondarily generated alkaline water can be used and high concentration ozonized water can be obtained in a short time, an ozonized water generator using an electrolysis method of water is preferable.

Figure 7:
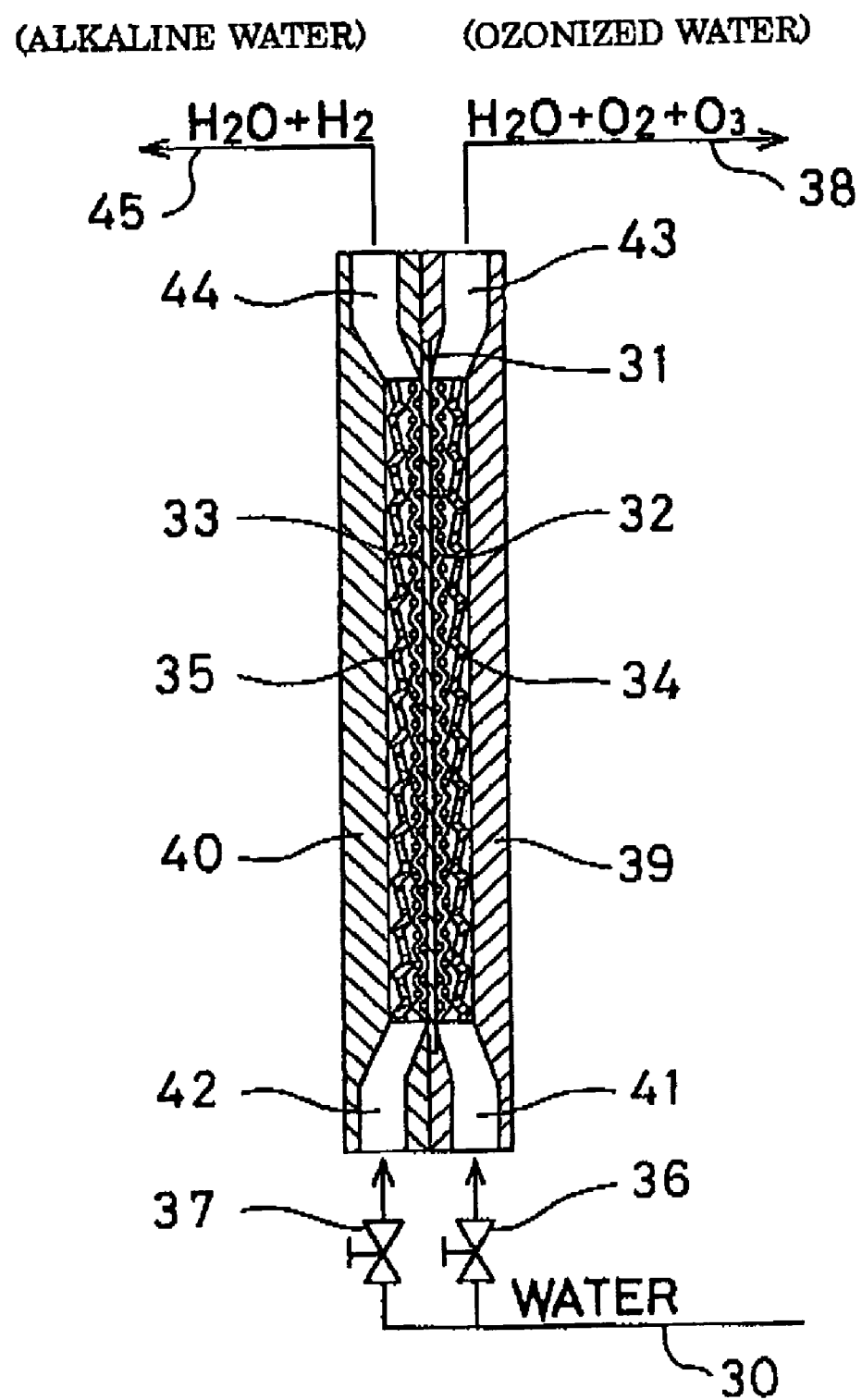
FIG. 7 is a main part schematic view of an electrolytic ozonized water generator used in the invention.

As such an electrolytic ozonized water generator, there is a well-known apparatus as disclosed in Japanese Patent Laid-Open No. 134677/1996. FIG. 7 shows its outline. In FIG. 7, an anode electrode 32 is disposed on one surface of an organic solid electrolyte film 31 so as to put the anode electrode 32 and the electrolyte film 31 together. Similarly, a cathode electrode 33 is disposed on the other surface of the organic solid electrolyte film 31 so as to put the cathode electrode 33 and the electrolyte film 31 together. As the organic solid electrolyte film 31, a fluorine-based ion exchange membrane with ozone resistance, or the like can be named. The anode electrode 32 is made of a wire net of noble metal having an ozone generation catalytic function.

Then, lath nets 34 and 35 are disposed on the outside surfaces of both the electrodes 32 and 33 over the whole length. The lath nets 34 and 35 are respectively lath nets made of metal having corrosion resistance against ozone, such as titanium or stainless steel. The respective electrodes are connected to a direct current power source (not shown) so that a direct current voltage can be applied between both the electrodes. Besides, an anode side jacket 39 and a cathode side jacket 40 are respectively disposed outside so as to contain the respective electrodes 32 and 33 and the lath nets 34 and 35. An inflow port 41 for materials water on the anode side, an inflow port 42 for a materials water on the cathode side, an outflow port 43 for the ozonized water and an outflow port 44 for the alkaline water are respectively formed in the respective jackets.

In this apparatus, while the direct current voltage is applied between both the electrodes, materials water is supplied to the respective electrode sides from a materials water piping 30 through valves 36 and 37 and the respective inflow ports 41 and 42 for materials water, then electrolysis of water is performed. When the electrolysis of water is performed, an OH ion (OH$^-$) generated by the electrolysis of water is collected at the side of the anode 32. This OH ion becomes ozone by the action of the ozone generation catalysis of the anode. The ozone is immediately dissolved into the water and the ozonized water is generated. This ozonized water is fed into an ozonized water tank (not shown) from the outflow port 43 for ozonized water through a piping 38. Here, a complicated flow path is formed in the vicinity of the outer surface of the anode electrode 32 by the lath net 34 which is made of wire nets mutually connected in a stagger shape.

Thus, many small vortex flows are formed on the outer surface of the anode electrode. The ozone generated on the electrode surface is caught in the vortex flows and is quickly dissolved in the water. As a result, an amount of ozone gas flowing out together with water is decreased. Then, an amount of the dissolved ozone is increased, and high concentration ozonized water of approximately 30 ppm can be obtained.

Similarly, a hydrogen ion (H$^+$) generated by the electrolysis of water is collected to the electrode surface at the side of the cathode electrode 33. Then, the hydrogen ion becomes hydrogen gas, and is released from the water. An alkali metal ion, such as a sodium ion (Na$^+$) or calcium ion (Ca$^{++}$), and an alkaline earth metal ion, which are contained in the water in extremely small quantities, are also collected to the cathode surface. Those are condensed and the water at the cathode side is made alkaline water. Together with the foregoing hydrogen gas, it is fed to an alkaline water tank (not shown) from the outflow port 44 for alkaline water through a piping 45. As stated above, the alkali metal ion and the alkaline earth metal ion (mainly Na$^+$) contained in the water in extremely small quantities together with the hydrogen gas, are also condensed at the cathode side. As a result, it is confirmed that alkaline water of not less than pH 9 and not higher than pH 11 or not less than that is generated as water at the cathode side.

Incidentally, this pH value varies according to the ratio of the quantities of water supplied to both the electrode sides. If the quantity of water supplied to the cathode side is made smaller than the quantity of water supplied to the anode side, the pH value becomes relatively high, on the contrary, if made larger, the pH value becomes low.

Figure 8:
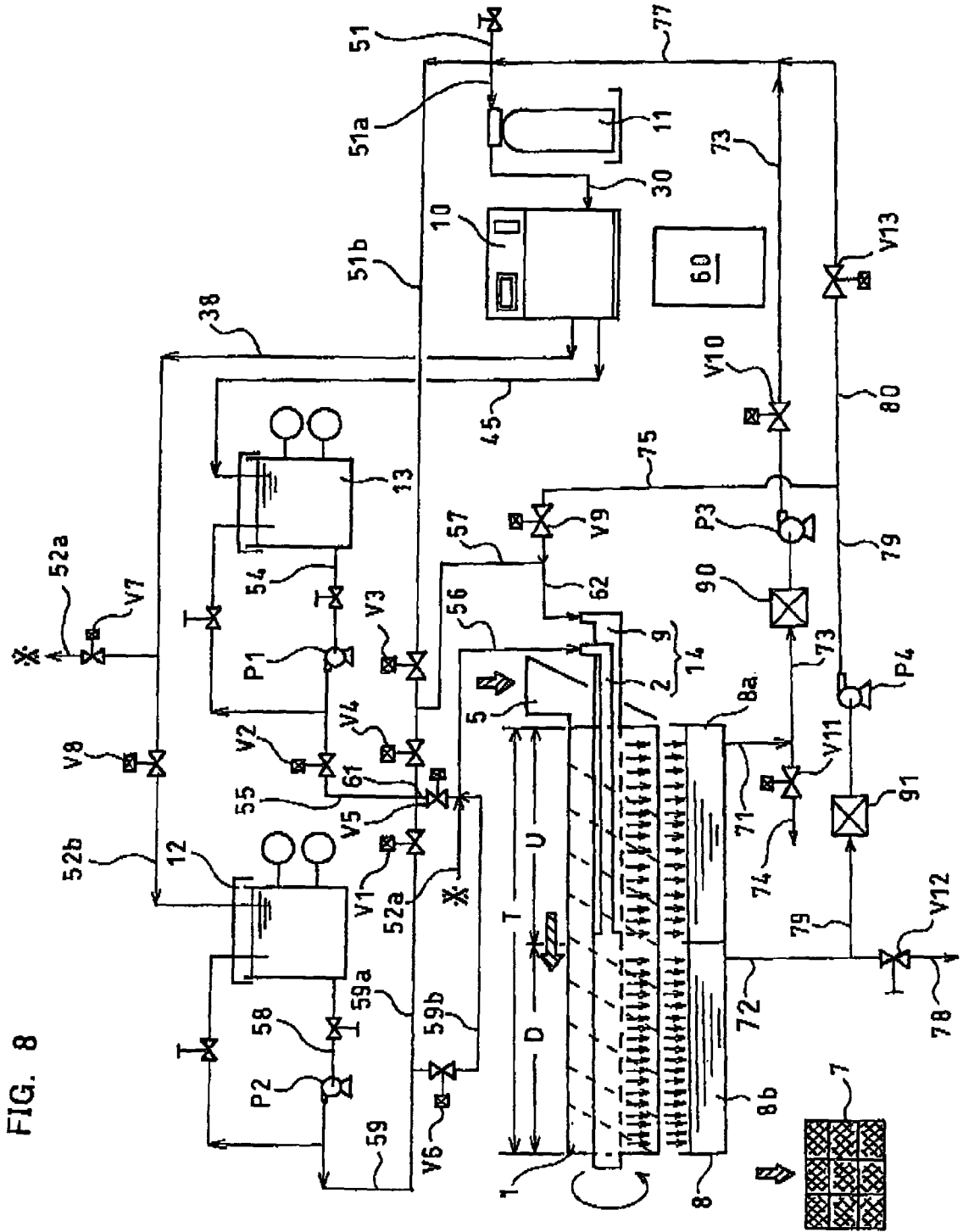
FIG. 8 is a flow view of a washing apparatus of the invention in which an electrolytic ozonized water generator is applied.
Figure 9:
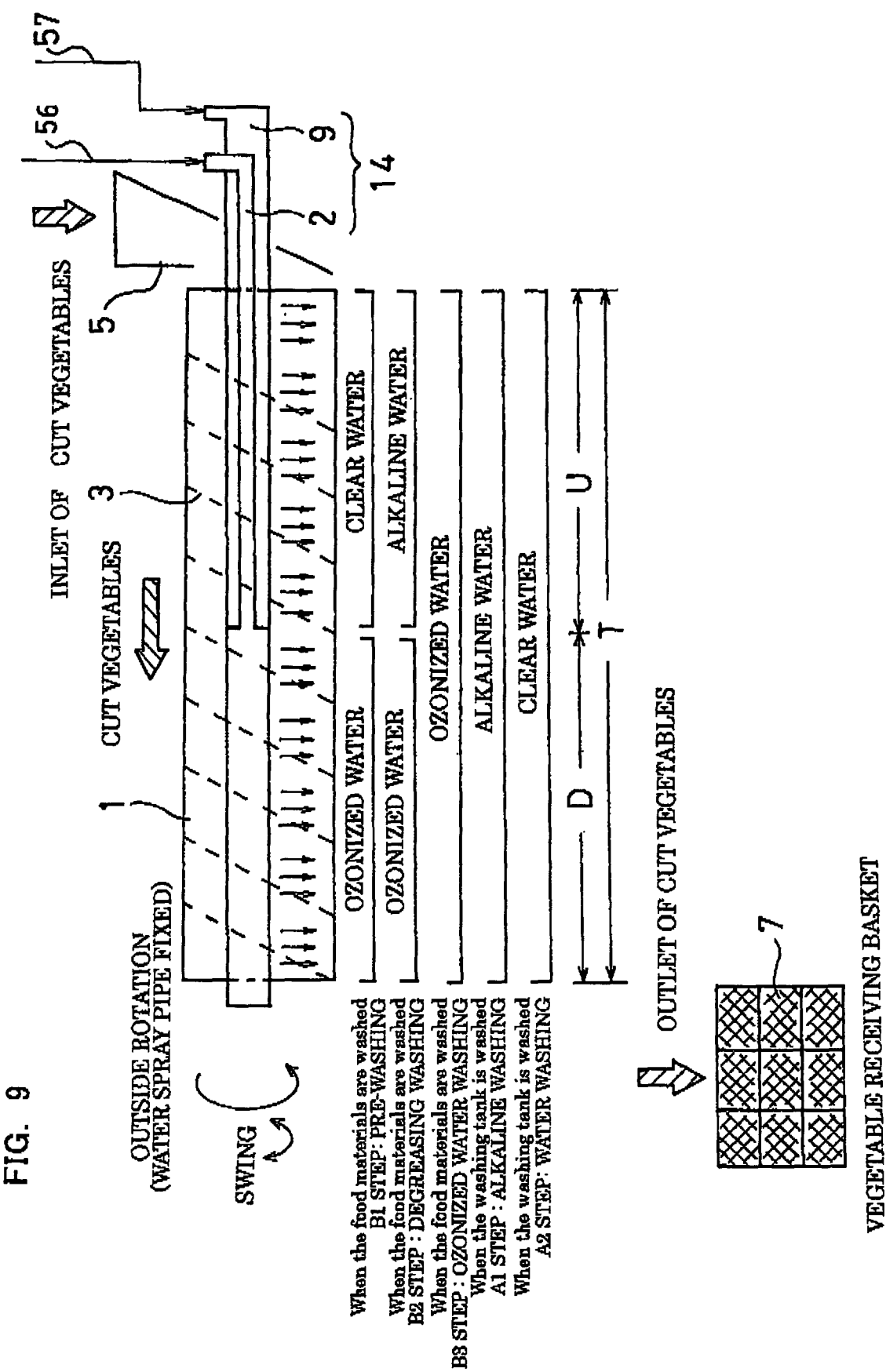
FIG. 9 is a changeover conceptual view of a washing process by the apparatus of FIG. 8.

Next, a food materials washing apparatus according to the invention using the electrolytic ozonized water generator and a washing method will be described. FIG. 8 is a whole flow view of the food materials washing apparatus of the invention, and FIG. 9 is an enlarged view of the washing tank 1 and the double pipe 14 shown in FIG. 8. Clean water such as tap water supplied from a piping 51 branches off to a piping 51$a$ and a piping 51$b$. The piping 51$a$ is a piping leading to an electrolytic ozonized water generator 10 (hereinafter simply referred to as "ozonized water generator"). The piping 51$b$ is a piping leading to a washing system. Materials water supplied from the piping 51$a$ becomes soft water in a water softener 11 in which a calcium ion (Ca$^{++}$) and a magnesium ion (Mg$^{++}$) contained in the materials water are removed, The soft water is supplied through the piping 30 to the ozonized water generator 10. Then, here, as described before, it is subjected to an electrolysis treatment, and ozonized water and alkaline water are generated. The ozonized water is fed to an ozonized water tank 12 through pipings 38 and 52$b$. The alkaline water is fed to an alkaline water tank 13 through the piping 45.

Washing Process of a Washing Tank and Food Materials

In an actual washing operation of food materials, the following process is carried out: "Before-washing process of washing tank" (A process) in which washing of the washing tank itself is performed before washing of the food materials; "Food materials washing process" (B process) carried out subsequently to the washing of the washing tank 1; and "After-washing process of washing tank" (C process) in which the washing tank contaminated by the washing of the food materials is washed.

Before-washing Process of Washing Tank

There are following steps as the above "Before-washing process of washing tank" (A process). "Alkali before-washing step of washing tank" (A1 step) in which washing of the washing tank is performed by alkaline water; "water before-washing step of washing tank" (A2 step) in which washing of the washing tank is performed by clean water; and "Alkaline water and water before-washing step of washing tank" (A3 step) in which clean water washing is performed after alkaline water washing.

"Alkali Before-washing Step of Washing Tank"

First, in the above A1 step (Alkali before-washing step of washing tank), an oily substance stuck on the washing tank 1 is dissolved and removed by the alkaline water. In this step, valves V1, V3 and V6 are set "closed", valves V2, V4 and V5 are set "opened", and a pump P1 is activated. Then, the alkaline water in the alkaline water tank 13 is supplied to a piping 55 through a piping 54, the pump P1, and the valve V2. In that portion, the alkaline water is divided into two flows, one leading to the second wash water piping 2 through a piping 61, the valve V5 and a piping 56, and the other leading to the first wash water piping 9 from the valve V4 through, pipings 57 and 62. The first wash water piping 9 constitutes the double pipe 14 as an outer pipe part of the second wash water piping 2. The outer pipe part exists from an end at the side of the food inlet 5 of the washing tank 1 to a substantially half position of the washing tank 1 in the axial direction, that is, in a former half portion U of the washing tank 1 in the axial direction. Besides, many wash water spray holes 9$a$ are bored in the axial direction. On the other hand, the second wash water piping 2 as an inner pipe part of the structure of the double pipe 14 extends over the whole length T of the washing tank 1. Its water spray holes 2a are formed in a portion where the first wash water piping 9 does not exist, that is, only in a rear half portion D of the washing tank 1.

Thus, the alkaline water supplied from the piping 62 to the first wash water piping 9 is sprayed to the front half portion U of the washing tank 1 and performs washing of the washing tank. On the other hand, since the water spray holes 2a are included in only the rear half portion D of the washing tank 1, the alkaline water supplied through the piping 56 to the second wash water piping 2 (inner pipe of the double pipe 14) performs washing of only the rear half portion D of the washing tank 1.

Also in this washing process, the washing tank 1 is rotated in the foregoing manner. Accordingly, the alkaline water repeats the washing tank storage process, the washing process, and the drain process in this order every rotation of the washing tank. Incidentally, in this washing step, it is also possible to perform the swing operation by changing over the rotation direction of the washing tank between the normal and reverse directions. However, there is no problem even if the swing operation is not performed.

Water Before-washing Step of Washing Tank

Next, the A2 step is a washing step using the clean water instead of the alkaline water, and is a step for washing away dust stuck on the washing tank 1. In this A2 step, the pump P1 is stopped, the valves V1, V2 and V6 are set "closed", and the valves V3, V4 and V5 are set "opened". The clean water is supplied to the branch piping 51b branching off from the clean water piping 51. The clean water is divided into two flows through the valve V3. Part of the clean water is supplied through the pipings 57 and 62 to the first wash water piping 9. The remainder of the clean water enters the piping 61 through the valve V4, and then, is supplied to the second wash water piping 2 through the valve V5 and the piping 56. Then, similarly to the foregoing case, in the front half portion U of the washing tank 1, the clean water is sprayed from the first wash water piping 9. In the rear half portion D of the washing tank 1, the clean water is sprayed from the second wash water piping 2, and the water washing in the washing tank is performed while the washing tank 1 is rotated.

Alkaline Water and Water Before-washing Step of Washing Tank

In the A3 step (alkaline water and water before-washing step of washing tank), after the washing by the alkaline water of the A1 step is performed, water washing by the clean water of the A2 step is again performed. With respect to this step, the propriety of its execution should be suitably judged according to the kind of food materials to be washed, pH of the alkaline water used, and the like.

Food Materials Washing Process

When the washing prior to the use of the washing tank 1 is ended in this way, the procedure proceeds to the [Food materials washing process] (B process). In the [Food materials washing process] (B process), while predetermined food materials are put in the washing tank 1 through the inlet 5, washing of the food materials by ozonized water is performed. Further, there are the following steps as the B process : "Pre-washing and washing step of food materials" (B1 step) in which food materials are washed by clean water and ozonized water; "Degreasing and washing step of food materials" (B2 step) in which washing is performed using alkaline water and ozonized water; and "Ozonized water washing step of food materials" (B3 step) in which washing is performed by using only ozonized water.

Pre-washing and Washing Step of Food Materials

First, the B1 step (Pre-washing and washing step of food materials) is washing by a combination of clean water and ozonized water. This step is adopted in such a case that dirt such as soil or dust is stuck on the food materials. While the washing tank 1 is rotated, soil or dirt stuck on the food materials is removed by the washing using the clean water in the front half portion U as the upstream side of the washing tank 1. Subsequently, finish washing and sterilization by the ozonized water is performed in the rear half portion D of the washing tank 1 as the downstream side. Accordingly, in this step, for the first wash water piping 9 for supplying the clean water, the valve V3 is set "opened", and the valve V4 is set "closed". The clean water is supplied from the piping 51b of the clean water through the valve V3 and the pipings 57 and 62 to the first wash water piping 9. The clean water is sprayed to the front half portion U in the washing tank 1, and the water washing of the food materials is performed. On the other hand, for the second wash water piping 2 for supplying the ozonized water, the valves V1 and V5 are set "closed", the valve V6 is set "opened", and a pump P2 is activated. Then, the ozonized water is supplied from the ozonized water tank 12 through a piping 58, the pump P2, a piping 59, the valve V6, and the pipings 59b and 56 into the second wash water piping 2. The ozonized water is sprayed to the rear half portion D of the washing tank 1, and the finish washing and sterilization of the food materials are performed.

Incidentally, also in this case, in order to raise the washing efficiency, the swing operation for suitably repeating the normal rotation and reverse rotation of the washing tank 1 in the state where the clean water or the ozonized water is stayed in the washing tank 1 may be performed.

Food Materials Degreasing and Washing Step

Next, the B2 step (food materials degreasing and washing step) is washing by a combination of alkaline water and ozonized water. It is adopted in such a case that dirt due to an oily substance is stuck on the food materials. While the washing tank 1 is rotated, the dirt due to the oily substance stuck on the food materials is removed by the washing using the alkaline water in the former half portion U as the upstream side of the washing tank 1. Subsequently, finish washing and sterilization by the ozonized water is performed in the rear half portion D of the washing tank 1 as the downstream side. Accordingly, in this step, for the first wash water piping 9 for supplying the alkaline water, similarly to the foregoing case of the alkaline water supply, the valves V2 and V4 are set "opened", the valves V1, V3 and V5 are set "closed", and the pump P1 is activated. Then, the alkaline water in the alkaline water tank 13 is supplied through the piping 54, the pump P1, the valve V2, the piping 55, the valve V4, and the pipings 57 and 62 into the first washing piping 9. Then, the alkaline water is sprayed from the water spray holes formed in the first wash water piping 9 to the front half portion U of the washing tank 1, and dissolving and washing of the oil substance stuck on the food materials is performed. On the other hand, similarly to the above first step, the ozonized water in the ozonized water tank 12 is supplied through the piping 58, the pump P2, the piping 59, the valve V6, and pipings 59b and 56 into the second wash water piping 2. Then, the ozonized water is sprayed to the rear half portion D of the washing tank 1. By this, the finish washing and sterilization by the ozonized water is performed for the food materials sent from the front half portion U of the upstream side.

Incidentally, also in this case, in order to raise the washing efficiency, the swing operation for suitably repeating the normal rotation and reverse rotation of the washing tank 1 in the state where the alkaline water or the ozonized water is stayed in the washing tank 1 may be performed.

Food Materials Ozonized Water Washing Step

Next, the B3 step (food materials ozonized water washing step) is a step in which only the ozonized water is sprayed over the whole length T of the washing tank 1 and washing is performed. This is adopted in a case where food materials are not very contaminated, and sterilization and washing is a main object. Water spray of the ozonized water is performed from not only the second wash water piping 2 but also the first wash water piping 9. In this case, the valves V1, V4 and V6 are set "opened", the valves V2, V3 and V5 are set "closed", and the pump P2 is activated. Then, the ozonized water in the ozonized water tank 12 is supplied through the piping 58 and the pump P2 to the piping 59, and is divided there into two flows. Part of the ozonized water is supplied through the valve V6, and the pipings 59b and 56 to the second wash water piping 2, and then, is sprayed to the rear half portion D of the washing tank 1. The remainder of the ozonized water is supplied from the pipings 57 and 62 to the first wash water piping 9 through the piping 59a and the valves V1 and V4, and is sprayed to the front half portion U in the washing tank 1. By this, the ozonized water washing of the food materials is performed over the whole length of the washing tank 1.

Also in this case, in order to raise the washing efficiency, the swing operation may be performed in which the normal rotation and reverse rotation of the washing tank are suitably repeated in the state where the ozonized water is stayed in the washing tank 1.

Incidentally, in the above food materials washing process (B process), the throughput of food materials per unit time is proportional to the rotation speed of the washing tank 1. Thus, the amount of ozonized water sprayed is also adjusted in accordance with the throughput. The adjustment of the amount of ozonized water supply is basically performed by control of the revolution speed of the pump P2. However, according to circumstances, there is a case where it is required to treat a large amount of food materials exceeding the maximum drain rate of the pump P2 in a short time. With respect to only the throughput of food materials, if a staying time of the food materials in the washing tank 1 is shortened by raising the revolution speed of the washing tank 1, the throughput of food materials per unit time can be increased. However, feeding can not be performed in a state where the amount of ozonized water supply exceeds the maximum drain rate of the pump P2. Then, in order to deal with such a situation, the invention adopts the following structure. A branch piping 52a is disposed to the piping 38 for feeding the ozonized water to the ozonized water tank 12 from the ozonized water generator 10. This is connected to a suitable place at the drain side of the pump P2. The branch piping 52a is provided with a valve V7. Accordingly, in the case where a large quantity of ozonized water is temporarily required, the valve V7 is set "opened". Part of the ozonized water supplied to the ozonized water tank 12 from the ozonized water generator 10 is divided by the piping 52a. An amount of divided flow is supplied to the piping 56 at the drain side of the pump P2. By this, the divided flow of the ozonized water joins the ozonized water fed from the ozonized water tank 12. An amount of joined ozonized water is supplied from the piping 56 to the ozonized water piping 2. By this, it becomes possible that the ozonized water more than the ozonized water fed from the pump P2 is supplied to the second wash water piping 2.

Incidentally, in the case where the ozonized water is supplied also to the first wash water piping 9, the valves V1, V4 and V5 are set "opened". Then, the flow of the ozonized water supplied through the valves V1 and V4 and the pipings 57 and 62 to the first wash water piping 9 joins part of the ozonized water supplied from the piping 52a through the valve V5. Then, the joined ozonized water is supplied to the first wash water piping 9.

This branch piping 52a has various use modes. For example, in the case where the throughput of food materials is small, the pump P2 is stopped, the valves V1, V5 and V6 are set "closed", and the valves V7 and V8 are set "opened". By this, a predetermined quantity of ozonized water is directly supplied to the ozonized water piping 2 from the branch piping 52a through the piping 56, and the remainder of the ozonized water can be stored in the ozonized water tank 12 through the valve V8 and the piping 52b. However, in general, the following mode is preferable. The valve V7 is set "closed", the ozonized water in the ozonized water tank 12 is supplied to the second wash water piping 2, and surplus ozonized water is stored in the ozonized water tank.

Incidentally, the foregoing B1, B2 and B3 steps can be singly carried out in the food materials washing process. However, in the food materials washing process, it is also possible to carry out these steps by combining and changing over them. In this case, it is necessary that while the food materials put from the inlet 5 exist in at least the front half portion U of the washing tank 1, changeover of one cycle is completed. For example, in the case where alternate changeover is performed between the B2 step (alkaline water washing+ozonized water washing) and the B1 step (water washing+ozonized water washing), while a block of specific food materials inputted in the washing tank 1 from the inlet 5 exists in the front half portion U of the washing tank 1, the alkaline water washing and the clean water washing are performed. Thereafter, the block of the food materials is conveyed to the rear half portion D of the washing tank 1.

Washing Tank After-washing

When the washing of a specified amount of food materials is ended in the manner as described above, finally, the procedure proceeds to the after-washing process (C process) of the washing tank 1. As steps performed in this process, there are following steps, and these steps are suitably selected and performed: "Alkali after-washing step of washing tank" (C1 step) in which the washing tank is washed by alkaline water; "Water after-washing step of washing tank" (C2 step) in which the washing tank is washed by clean water; and "alkaline water and water after-washing step washing tank" (C3 step) in which after the alkaline water washing (C1 step) is performed, clean water washing (C2 step) is performed. Incidentally, since the C1, C2 and C3 steps are identical to the A1, A2 and A3 steps, the detailed description is omitted.

Cyclic Use of Drain Wash Water

In the above respective processes, the ozonized water, the alkaline water or the clean water drained from the washing tank 1 flows down into the drainage receiving tank a disposed below the washing tank 1. The receiving tank 8 is constituted by a front receiving tank 8a and a rear receiving tank 8b. The front receiving tank 8a receives drainage from the front half portion U of the washing tank 1. The rear receiving tank 8b receives drainage from the rear half portion D of the washing tank 1. The drain wash water flowing down into the front receiving tank 8a is drained through a piping 71, a valve V11 and a piping 74 to a drainage groove (not shown). The drain wash water flowing down to the rear receiving tank 8b is drained through a piping 72, a valve V12 and a piping 78 to the drainage groove. However, it is also possible to cyclically use the drain wash water flowing down to the receiving tanks 8a and 8b. A case of cyclic use will be described below.

First, a description will be given of an ozonized water recycle step in the case where the B2 step (food materials ozonized water washing step) is adopted in the B process "food materials washing process". In this step, the ozonized water is sprayed from both the first and the second wash water pipings 9 and 2 into the washing tank 1. Since the food materials are sequentially washed while they are conveyed from the front half portion U of the washing tank 1 to the rear half portion D, the ozonized water drained from the rear half portion D is less contaminated than the ozonized water drained from the front half portion U. Accordingly, the ozonized water drained from the rear half portion D and flowing down to the rear receiving tank 8b can also be used for washing of the food materials in the front half portion U.

In this step, the valves V1 to V5 of the piping system for supplying the ozonized water from the ozonized water tank 12 and the ozonized water generator 10 to the first wash water piping 9 are set "closed", the valve V6 of the piping system for supplying the ozonized water to the second wash water piping 2 is set "opened", the valve V12 of the drain wash water piping system in the rear receiving tank 8b is set "closed", a valve V9 is set "opened", and a pump P4 is actuated, Then, the ozonized water drained from the rear half portion D of the washing tank 1 and stored in the rear receiving tank 8b is supplied to a filter device 91 through the pipings 72 and 79. Here, solid matter included in the drain ozonized water is removed. Subsequently, the ozonized water is supplied to the first wash water piping 9 through the pump P4, the pipings 79 and 75, the valve V9, and the piping 62, and is sprayed to the front half portion U of the washing tank 1. Incidentally, since the ozonized water in the rear receiving tank 8b is ozonized water which is hardly contaminated, the filter device 91 is not necessarily required. However, in the case where mixture of dust is expected, it is preferable to dispose the filter device 91.

Besides, the ozonized water flowing down from the front half portion U and stored in the front receiving tank 8a is made to flow out to the foregoing drainage groove through the piping 71, the valve V11 and the piping 74. However, it can also be used as materials water of the ozonized water generator 10. In this case, the valve V11 is set "closed", a valve V10 is set "opened", and the pump P3 is actuated. Then, the drain ozonized water stored in the front receiving tank 8a flows to the filter device 90 from the piping 71 through a piping 73. Solid matter, such as soil particles, contained in the drain ozonized water is removed there. The drain ozonized water joins the materials water piping 51 through the pump P3, the valve V10 and a piping 77, and is returned to the ozonized water generator 10 through the foregoing water softener 11. The filter device 90 treats the ozonized water drained from the front half portion U of the washing tank 1 in which the food materials are first washed. According to the state of the food materials, there are various food materials from one which is previously subjected to water washing prior to shipping and is relatively less contaminated, to one which is seen to be contaminated noticeably with adherent soil. However, most of them are washed and the dirt is removed before they are put on the market, Accordingly, the ozonized water drained from the front half portion U is not contaminated noticeably, and a small quantity of contained soil is also deposited in the front receiving tank 8a. Further, even if some inorganic particles such as soil particles are contained, there is no influence on the ozonized water generator. Apart from the case of heavy dirty, the filter device 90 is not necessarily indispensable. In this connection, the front receiving tank 8a is subdivided, drain ozonized water at the most upstream side in which contamination of drainage is heaviest is drained to the drainage groove, and only drain ozonized water at the midstream and the following in which the contamination is relatively low can be returned to the ozonized water generator. In this case, according to the degree of contamination of the drain ozonized water, it is also possible to omit the filter device 90.

Incidentally, all of the drain ozonized water in the rear receiving tank 8b are not supplied to the first wash water piping 9, but only a part is supplied, and the remainder of the drain ozonized water can be returned to the materials water inlet piping 51 of the ozonized water generator 10 through a piping 80, a valve V13, and the piping 77. In this case, the ozonized water supplied to the first wash water piping 9 through the piping 75, the valve V9, and the piping 62 is decreased. Accordingly, similarly to the foregoing case, it is also possible to adopt a method in which the fresh ozonized water in the ozonized water tank 12 is supplied to the piping 62 through the piping 58, the pump P2, the pipings 59 and 59a, the valves V1 and V4 and the piping 57.

Incidentally, other than the ozonized water, alkaline water or clean water is sprayed in a process as set forth below. In the case of "Alkaline water before-washing step of washing tank" (A1 step) in the washing process of the washing tank 1, "alkaline water after-washing step of washing tank" (C1 step), or the "before-washing step of washing tank" (A2 step), or the "After-washing step of washing tank" (C2 step), the alkaline water or the clean water is sprayed to the front half portion U of the washing tank 1 and the rear half portion D. Thus, also in this case, similarly to the case of the recycle use of the ozonized water, it is also possible to recycle the wash water (alkaline water or clean water) flowing down to the rear receiving tank 8b to the first wash water piping 9. At the same time, it is also possible to return the wash water flowing down to the receiving tank 8a to the ozonized water generator 10.

Further, in the case where the kind of the wash water is different between the front half portion U of the washing tank 1 and the rear half portion D, it is impossible to recycle the drain water of the rear half portion D to the front half portion U. However, it is possible to return the wash water in the front receiving tank 8a or the rear receiving tank 8b to the materials water inlet side of the ozonized water generator 10. For example, in the "food materials washing process" (B process), and in the "Pre-washing and washing step of food materials" (B1 step) in which the clean water is sprayed to the front half portion U, and the ozonized water is sprayed to the rear half portion D, or in the "food materials degreasing and washing step" (B2 step) in which the alkaline water is sprayed to the front half portion U and the ozonized water is sprayed to the rear half portion D, the wash water in the front receiving tank 8a or the rear receiving tank 8b can be returned to the materials water inlet side of the ozonized water generator 10. Specifically, in the case where the wash water is returned from the front receiving tank 8a, the valve V11 is set "closed", the valve V10 is set "opened", and the pump P3 is actuated. Then, the drain wash water in the receiving tank 8a enters the filter member 90 disposed in the piping 73 through the piping 71. Solid matter is removed there from the drain wash water. The drain wash water is returned to the materials water piping 51 through the pump P3 and the piping 77. On the other hand, in the case where it is returned from the rear receiving tank 8b, the valves V12 and V9 are set "closed", the valve V13 is set "opened", and the pump P4 is activated. Then, the drain wash water in the receiving tank 8b enters the filter member 91 of the piping 79 through the piping 72. Solid matter in the drain wash water is removed there. The drain wash water is returned to the materials water piping 51 by the pump P4 through the piping 80, the valve V13 and the piping 77. Incidentally, it is also possible to return the drain wash water in both the front receiving tank 8a and the rear receiving tank 8b to the materials water inlet side of the ozonized water generator 10. In this case, it becomes possible to suppress the use of the fresh clean water supplied from the materials water supply piping 51 to the minimum.

Incidentally, the changeover operation of the valves in the above description, the operation of the activation and stop of the pumps, and the rotation operation of the washing tank are all controlled automatically based on previously inputted control values. The control values are previously inputted to a control plate 60 installed at the apparatus side.

Besides, in the above embodiment, the second wash water piping 2 and the first wash water piping 9 are constituted by the double pipe 14. However, the second wash water piping 2 and the first wash water piping 9 are respectively independent from each other and may be disposed in parallel at the center of the washing tank 1. In this case, the water spray holes 2a are bored only in the rear half portion of the first wash water piping 2, and the water spray holes 9a are bored only in the front half portion of the first wash water piping 9. By that, it is possible to spray the alkaline water, the ozonized water and the clean water quite similarly to the case of the double pipe. Besides, water spray holes may be formed over the whole length of both the wash water pipings 2 and 9 disposed to be parallel with each other. In this case, in the "food materials washing step", by a timer operation of the valve, the ozonized water and the clean water or the alkaline water are alternately sprayed every predetermined time, for example, every rotation of the washing tank 1.

Besides, the second wash water piping 2 and the first wash water piping 9 may be constituted by one common piping, In this case, in the "food materials washing step", the ozonized water and the clean water or the alkaline water are alternately made to flow by an automatic valve operation, and the changeover is performed every rotation of the washing tank 1. In brief, in the invention, the way of changing over the ozonized water, the clean water and the alkaline water and the form of the pipings are basically arbitrary. Also in the before-washing process of the washing tank 1 and the after-washing step of washing tank, which are performed before and after the washing step of food materials, washing can also be performed by the ozonized water. The invention is not limited to the flow shown in FIG. 8.

Besides, in the illustrated apparatus, the spiral member 3 is disposed in the washing tank 1, and with the rotation of the washing tank 1, food materials are automatically sent from the inlet to the outlet. Such an apparatus is effective in the case where a large amount of food materials are continuously subjected to a washing treatment. However, in the case where a small amount of food materials is subjected to a batch processing, the spiral member is not required. In this case, the washing tank 1 is horizontally installed, and both ends are hermetically sealed or a weir is formed to such a degree that inside water does not flow out, and further, an openable door is provided at the drainage part 4 of the washing tank 1. At the time of washing, the door of the drainage part 4 is opened, and the food materials are put in the inside. After this is closed, while the washing tank 1 is rotated, the ozonized water is sprayed and the washing of the food materials is performed. After the washing, the drainage part 4 is positioned down, and when the door is opened, the food materials drop into the receiving basket.

Further, the shape of the spiral member 3 may be a discontinuous spiral in which the continuous spiral is partially cut, in addition to the continuous spiral. Especially in the case of the discontinuous spiral, the spiral member must be formed such that it becomes a weir for causing the ozonized water to stay in at least the bottom when the drainage part 4 is positioned up by the rotation of the washing tank 1.

Besides, in the illustrated apparatus, the ozonized water generated by the ozonized water generator 10 is once supplied to the ozonized water tank 12. Since the ozonized water is once stored in the ozonized water tank 12, it becomes unnecessary to frequently perform the control of the ozonized water generator. Thus, it is practical. However, direct feeding may be performed from the ozonized water generator 10 to the second wash tank piping 2 or the like. In this case, in accordance with the amount of ozonized water demanded, the amount of materials water supply to the ozonized water generator 10 is adjusted so that the amount of ozonized water generated is adjusted. Thus, the ozonized water tank 12 becomes unnecessary, and reduction in installation cost becomes possible.

EXAMPLE 1

Next, a washing test of cut vegetables using ozonized water by the method and the apparatus of the invention will be described. The sectional shape of a small washing tank used for the test is a regular hexagon having one side of 150 mm. The small washing tank used for the test is a hexagonal cylinder having a length of 500 mm. A piping of 40 mm φ (diameter) is disposed at its center in a longitudinal direction. One surface of the hexagonal cylinder is a porous plate in which a large number of small holes are bored, This constitutes a drainage part. This washing tank was used and the washing test was carried out under the following conditions.

(1) Sample: cut cucumber of 2 kg (2) Washing method: The cut cucumber of 2 kg was put in the above washing tank for the test, and while the washing tank was rotated at a revolution speed of 30 rpm, the washing test was carried out as follows:

<1> water washing: water was sprayed from the above piping for one minute (about 40 liters) to perform water washing, <2> ozonized water washing: ozonized water with an ozone concentration of 10 ppm was sprayed at a flow rate of 53 liters/minute to perform washing, and <3> sampling: sampling was performed at two places before the water washing, after the water washing, at a point of time when 90 seconds (one minute and a half, ozonized water flow of 80 liters) passed, and a point of time when 180 seconds (three minutes, ozonized water flow of 160 liters) passed.

(3) Sterilization estimation: general live bacteria of the sampled cut cucumber was cultivated in a standard agar medium, the number was counted, and its average value was obtained. The results are as follows: Incidentally, a left numerical value in a parenthesis indicates a value when a state before the water washing is made 100%, and a right numerical value indicates a value when a state after the water washing is made 100%.

<1> before the water washing: 3080 thousand (100%, - - - )

<2> after the water washing; 737.5 thousand (23.9%, 100%)

<3> after the ozonized water washing for 90 seconds: 62.5 thousand (2.0%, 8.4%)

<4> after the ozonized water washing for 180 seconds: 57.1 thousand (1.8%, 7.7%)

As is apparent from the above test results, by the ozonized water washing for one minute and a half, as compared with the state before the water washing, which is the state of raw vegetables, the number of live bacteria decreases to about 2%. As compared with the case of only the water washing, the number of bacteria decreases to 7% or more and 8% or lower. From this, it is understood that the number of live bacteria can be reduced (sterilized) to about 2% in the ozonized water washing for one minute or more and two minutes or lower. In this meaning, it becomes possible to perform necessary washing with a small quantity of wash water (ozonized water), and it may be gathered that a great saving of water resources also becomes possible.

EXAMPLE 2

A test was carried out as follows: Two small washing tanks used for the example 1 were coupled, ozonized water was sprayed to each of them, and drain ozonized water from the rear half portion was recycled to the former half portion drain ozonized water from the front half portion was returned to the materials water inlet side of the electrolytic ozonized water generator. Test conditions are as follows:

(1) Electrolytic ozonized water generator

<1> amount of ozonized water (concentration of 10 ppm) generated: 25 liters/minute <2> amount of alkaline water generated: 3 liters/minute (not used but drained)

(2) Sample: cut lettuce (shredded in the order of a size of a human hand)

(3) washing method: The cut lettuce was put in the above washing tank at a speed of 100 kg/hr, and while the washing tank was rotated at a revolution speed of 30 rpm, ozonized water was sprayed as follows:

<1> rear half portion of the washing tank: fresh ozonized water of a concentration of 10 ppm generated by the above electrolytic ozonized water generator was sprayed at a speed of 25 liters/minute.

<2> front half portion of the washing tank: the whole quantity of drain ozonized water draind from the rear half portion of the washing tank was supplied and sprayed to the front half portion of the washing tank.

(4) Return flow of drain ozonized water; Until the drain ozonized water drained from the front half portion of the washing tank is stored in the drainage receiving tank, tap water is kept supplied to the electrolytic ozonized water generator at a flow of 28 liters/minute. At a point of time when the water of about 50 liters was stored, this was made to pass through a filter device for removing only solid matter, and return flow to the materials water inlet side of the electrolytic ozonized water generator was started at a flow of 25 liters/minute. At the same time, supply of the tap water was changed to a flow of 3 liters/minute.

As a result of the test under the above conditions, the following items were confirmed.

(a) The concentration of the drain ozonized water drained from the rear half portion of the washing tank decreased to about 2 ppm. However, the drain ozonized water had sufficient sterilization performance.

(b) With respect to the drain ozonized water drained from the rear half portion of the washing tank, dirt was not recognized by visual observation. The drain ozonized water can be directly supplied to the front half portion.

(c) With respect to the drain ozonized water drained from the front half portion of the washing tank, soil particles were confirmed though they were few. However, if only the solid particles are removed through the filter device, it may be returned to the inlet side of the electrolytic ozonized water generator. There is no problem in the operation of the electrolytic ozonized water generator, and ozonized water of a set concentration (10 ppm) can be stably generated.

As is apparent from the test results, the drain ozonized water can be returned to the electrolytic ozonized water generator. By this, it becomes possible to greatly decrease (reduction of about 90%) the amount of the tap water used from 28 liters/minute to 3 liters/minute. Incidentally, in the above example, although all the alkaline water generated by the electrolytic ozonized water generator is drained, as described above, this alkaline water can also be used. Besides, if this alkaline water is also returned to the inlet side of the electrolytic ozonized water generator, a cyclic use of approximately 100% becomes possible. Accordingly, the clean water such as the tap water is supplied only at the beginning, and only the clean water corresponding to a leakage amount from the washing apparatus has only to be supplied during the washing operation. A great reduction in the amount of wash water used can be expected.

As described above, according to the food materials washing apparatus of the invention, the washing tank 1 is formed into the cylindrical body, and while this is rotated, the ozonized water is sprayed, and the renewal of the ozonized water is performed every rotation of the washing tank 1. Thus, it becomes possible to realize a sufficient washing sterilization effect by a small quantity of ozonized water.

Especially, if the spiral member 3 is disposed in the washing tank 1, with the rotation of the washing tank 1, food materials put in the washing tank are subjected to washing by the ozonized water, and are automatically conveyed from the inlet side to the outlet side. Thus, it becomes possible to continuously perform the washing treatment of a large amount of food materials, and as compared with a conventional batch processing method, it becomes possible to perform the washing treatment in a short time. As a result, in a large restaurant, a giant center for supply of food or the like, even in the case where food materials for several thousand people per day are subjected to the washing treatment, it becomes possible to perform the treatment collectively in a short time.

In addition, even in the case where harmful bacteria such as O-157 stick on the food materials and the bacteria generate toxin, not only the bacteria are sterilized by the ozonized water, but also the toxic matter is oxidized and dissolved, and therefore, it can be said to be a very desirable sterilization method from the viewpoint of food material sanitation.

Besides, if the water electrolytic ozonized water generator is adopted as the ozonized water generating apparatus, alkaline water secondarily generated at the cathode side can be used as wash water of the washing tank and food materials. Further, if the alkaline water is made to be sprayed from the wash water piping disposed in the washing tank, washing of the washing tank and the food materials becomes possible by the changeover operation of the valves. Thus, a cleanser and a tool for the washing of the washing tank become unnecessary, and not only the washing operation of the washing tank is simplified, but also the use of the cleanser as a cause of environmental pollution becomes unnecessary, and there is also an effect from a viewpoint of earth environment.

Further, in the case of the mode in which the alkaline water washing and water washing of the washing tank, and the water washing, alkaline water washing and ozonized water washing of the food materials are performed by the automatic changeover operation of the valves, all operations from the washing of the washing tank before use to the washing of the food materials and the washing of the washing tank after use are automated. Thus, a great person-saving effect can be expected.

Besides, in the case of the embodiment in which the swing operation by changing over the normal rotation and reverse rotation in the rotation direction of the washing tank is performed in the state where the drainage part is positioned up, the washing can be performed by effectively using the ozonized water or the like stayed in the lower part of the washing tank at the time of the washing process of the food materials and the washing tank. Especially in the case of the food materials, since a turnaround of food materials is performed in the washing tank by the changeover of the rotation direction, the ozonized water or the like permeates every part of the food materials, and the washing effect can be further raised. Besides, at the same time, the amount of ozonized water used can be reduced by the effective use of the ozonized water.

Besides, in the case of the embodiment in which the wash water piping provided in the washing tank is connected to both the ozonized water generator and the ozonized water tank, and the supply of ozonized water can be performed from any of them by the changeover operation of the valves, when there occurs a demand for the ozonized water exceeding the amount of ozonized water generated by the ozonized water generator per unit time or the drain capacity of the ozonized water supply pump of the ozonized water tank, it becomes possible to supply the ozonized water to the washing tank from both. Accordingly, it becomes possible to flexibly deal with a peak demand without providing a large capacity ozonized water generator corresponding to the peak demand for the ozonized water. As a result, installation costs can be reduced.

Further, in the embodiment in which the washing tank is divided into the front half portion and the rear half portion, the first and the second wash water pipings for spraying the wash water to each of them are disposed, and the wash water (ozonized water, alkaline water or clean water) used for the rear half portion is recycled to the front half portion, it is possible to reduce the amount of wash water used to approximately half. As a result, a great energy-saving and resource-saving effect can be expected.

Further, in the case of the mode in which the ozonized water sprayed to the washing tank is received by the drain water receiving tank, and this is returned to the materials water inlet side of the ozonized water generator, water recycle of 100% is possible in principle. At least, as compared with the case where wash water once sprayed is directly draind to a drainage groove, it becomes possible to save water resources at about 90%. Thus, in a washing workshop of food materials using a large quantity of wash water, a great reduction in cost is enabled, In addition, also from the viewpoint of earth environment protection, a remarkable effect can be expected.

INDUSTRIAL APPLICABILITY

As described above, according to the invention, while the ozonized water is effectively used, the continuous washing and sterilization treatment of food materials becomes possible. In addition, a harmful toxin generated by bacteria sticking on the food materials is also made nontoxic by strong oxidizing and dissolving force of the ozonized water. Besides, materials water is also effectively used by the recycle of the wash water. Thus, the food washing apparatus according to the invention and the washing method are very useful for washing and sterilization of various food materials to be eaten raw, or for washing and sterilization of food materials before cooking, and for washing and sterilization of preserved food materials. Then, a great contribution in food material sanitation is expected.

The invention claimed is:

1. A food washing apparatus for washing food materials such as food material stuffs to be eaten raw, grains, tubers, seeds, or nuts by using ozonized water, comprising:
   an ozonized water generator;
   a washing tank in which the food materials are put and which can rotate to wash the food materials, the washing tank having a polygon shaped cross-section extending perpendicular to an axis of rotation of the washing tank;
   a drainage part formed on only one side of the polygon shaped cross-section of the washing tank and including a large number of openings to such a degree that water passes through and the food materials do not pass through; and
   wash water pipings which are disposed in the washing tank in an axial direction and in which water spray holes for spraying wash water including at least ozonized water generated by the ozonized water generator into the washing tank are formed,
   wherein while at least part of the wash water sprayed from the wash water pipings is drained from the washing tank every rotation of the washing tank, washing of the food materials is performed.

2. A food washing apparatus as set forth in claim 1, further comprising:
   a receiving tank for drain wash water drained from the washing tank; and
   wash water return flow pipings for returning at least one part of the drain wash water in the receiving tank to an inlet side of the ozonized water generator,
   wherein at least one part of the wash water drained from the washing tank is returned to a materials water inlet side of the ozonized water generator.

3. A food washing apparatus as set forth in claim 2, wherein an inlet for the food materials is disposed at one end of the washing tank, a outlet for the food materials is formed at the other end, and a spiral member for conveying, with rotation of the washing tank, the food put in the washing tank from a side of the inlet to the outlet is disposed on an inner wall surface of the washing tank.

4. A food washing apparatus as set forth in claim 3, wherein the spiral member is a continuous spiral member.

5. A food washing apparatus as set forth in claim 3, wherein the spiral member is a discontinuous spiral member.

6. A food washing apparatus as set forth in claim 3, wherein the washing tank is obliquely disposed to have a falling gradient from a side of the inlet to a side of the outlet.

7. A flood washing apparatus as set forth in claim 2, wherein the drainage part is formed to be continuous in a longitudinal direction of the washing tank, and the whole quantity of the sprayed ozonized water is drained every rotation of the washing tank.

8. A food washing apparatus as set forth in claim 2, wherein the drainage part is formed intermittently in a longitudinal direction of the washing tank, and part of the sprayed ozonized water is drained every rotation of the washing tank.

9. A food washing apparatus as set, forth in claim 2, wherein the drainage part is formed of a wire net or a porous metal plate.

10. A food washing apparatus as set forth in claim 2, wherein the polygon shaped cross-section of the washing tank is a hexagonal shaped cross-section.

11. A food washing apparatus as set forth in claim 2, wherein the wash water pipings are made rotatable, and by this, a water spray angle of the ozonized water from the water spray holes of the wash water pipings is made variable.

12. A food washing apparatus as set forth in claim 2, wherein the washing tank is constructed so that normal and reverse rotations can be made.

13. A food washing apparatus as set forth in claim 2, wherein the wash water pipings are constituted by a first wash water piping including a water spray hole in a front half portion of the washing tank and a second wash water piping including a water spray hole in a rear half portion of the washing tank, and one of ozonized water and clean water is enabled to flow through both the wash water pipings by a changeover operation of valves.

14. A food washing apparatus as set forth in claim 13, wherein in the front half portion of the washing tank, the second wash water piping and the first wash water piping are formed of a double pipe.

15. A food washing apparatus as set forth in claim 13, wherein the receiving tank of the wash water is constituted by a front receiving tank for wash water drained from, the front half portion of the washing tank and a rear receiving tank for wash water drained from the rear half portion.

16. A food washing apparatus as set forth in claim 15, wherein wash water reuse pipings for supplying at least one part of drain wash water in the rear half receiving tank to an inlet side of the first wash water piping.

17. A food washing apparatus as set forth in claim 15, wherein wash water return flow pipings for returning at least one part of the drain wash water in the rear receiving tank to the inlet side of the ozonized water generator are provided.

18. A food washing apparatus as set forth in claim 15, wherein wash water return flow pipings for returning at least one part of the drain wash water in the front receiving tank to the inlet side of the ozonized water generator are provided.

19. A food washing apparatus as set forth in claim 13, wherein an ozonized water tank for storing the ozonized water fed from the ozonized water generator is disposed, at least the second wash water piping is connected to both the ozonized water generator and the ozonized water tank, and the ozonized water is enabled to be supplied to at least the second wash water piping from one of or both of the ozonized water generator and the ozonized water tank by a changeover operation of valves.

20. A food washing apparatus as set forth in claim 2, wherein the wash water pipings are constituted by a first wash water piping including a water spray hole in a front half portion of the washing tank and a second wash water piping including a water spray hole in a rear half portion of the washing tank, the ozonized water is ozonized water generated at an anode side by an electrolysis method of water, and one of the ozonized water, alkaline water generated at a cathode side by the electrolysis method, and clean water is enabled to flow through both the wash water pipings by a changeover operation of valves.

21. A food washing apparatus as set forth in claim 2, wherein in the front half portion of the washing tank, the second wash water piping and the first wash water piping are formed of a double pipe.

22. A food washing apparatus as set-forth in claim 2, wherein the washing tank is constituted by coupling unit cylinders in each of which a spiral member is formed along an inner wall, to be separable in a longitudinal direction.

23. A food washing apparatus as set forth in claim 1, wherein an inlet for the food materials is disposed at one end of the washing tank, a outlet for the food materials is formed at the other end, and a spiral member for conveying, with rotation of the washing tank, the food put in the washing tank from a side of the inlet to the outlet is disposed on an inner wall surface of the washing tank.

24. A food washing apparatus as set forth in claim 23, wherein the spiral member is a continuous spiral member.

25. A food washing apparatus as set forth in claim 23, wherein the spiral member is a discontinuous spiral member.

26. A food washing apparatus as set forth in claim 23, wherein the washing tank is obliquely disposed to have a falling gradient from a side of the inlet to a side of the outlet.

27. A food washing apparatus as set forth in claim 1, wherein the drainage part is formed to be continuous in a longitudinal direction of the washing tank, and the whole quantity of the sprayed ozonized water is drained every rotation of the washing tank.

28. A food washing apparatus as set forth in claim 1, wherein the drainage part is formed intermittently in a longitudinal direction of the washing tank, and part of the sprayed ozonized water is drained every rotation of the washing tank.

29. A food washing apparatus as set, forth in claim 1, wherein the drainage part is formed of a wire net or a porous metal plate.

30. A food washing apparatus as set forth in claim 1, wherein the polygon shaped cross-section of the washing tank is a hexagonal shaped cross-section.

31. A food washing apparatus as set forth in claim 1, wherein the washing tank is constructed so that normal and reverse rotations can be made.

32. A food washing apparatus as set forth in claim 1, wherein the wash water pipings are constituted by a first wash water piping including a water spray hole in a front half portion of the washing tank and a second wash water piping including a water spray hole in a rear half portion of the washing tank, and one of ozonized water and clean water is enabled to flow through both the wash water pipings by a changeover operation of valves.

33. A food washing apparatus as set forth in claim 32, wherein in the front half portion of the washing tank, the second wash water piping and the first wash water piping are formed of a double pipe.

34. A food washing apparatus as set forth in claim 32, wherein the receiving tank of the wash water is constituted by a front receiving tank for wash water drained from the front half portion of the washing tank and a rear receiving tank for wash water drained from the rear half portion.

35. A food washing apparatus as set forth in claim 34, wherein wash water reuse pipings for supplying at least one part of drain wash water in the rear half receiving tank to an inlet side of the first wash water piping.

36. A food washing apparatus as set forth in claim 34, wherein wash water return flow pipings for returning at least one part of the drain wash water in the rear receiving tank to the inlet side of the ozonized water generator are provided.

37. A food washing apparatus as set forth in claim 34, wherein wash water return flow pipings for returning at least one part of the drain wash water in the front receiving tank to the inlet side of the ozonized water generator are provided.

38. A food washing apparatus as set forth in claim 32, wherein an ozonized water tank for storing the ozonized water fed from the ozonized water generator is disposed, at least the second wash water piping is connected to both the ozonized water generator and the ozonized water tank, and the ozonized water is enabled to be supplied to at least the second wash water piping from one of or both of the ozonized water generator and the ozonized water tank by a changeover operation of valves.

39. A food washing apparatus as set forth in claim 1, wherein the wash water pipings are constituted by a first wash water piping including a water spray hole in a front half portion of the washing tank and a second wash water piping including a water spray hole in a rear half portion of the washing tank, the ozonized water is ozonized water generated at an anode side by an electrolysis method of water, and one of the ozonized water, alkaline water generated at a cathode side by the electrolysis method, and clean water is enabled to flow through both the wash water pipings by a changeover operation of valves.

40. A food washing apparatus as set-forth in claim 1, wherein the washing tank is constituted by coupling unit cylinders in each of which a spiral member is formed along an inner wall, to be separable in a longitudinal direction.

41. A food washing apparatus for washing food materials such as food material stuffs to be eaten raw, grains, tubers, seeds, or nuts, by using ozonized water, comprising:
an ozonized water generator for generating ozonized water at an anode side by electrolysis of water and for generating alkaline water at a cathode side;
an ozonized water tank for storing the ozonized water generated at the anode side by the ozonized water generator;
an alkaline water tank for storing the alkaline water generated at the cathode side by the ozonized water generator;
a rotatable cylindrical washing tank in which a drainage part including a large number of openings to such a degree that water passes through and the food materials do not pass through is formed in a longitudinal direction; and
a second wash water piping which is disposed to pass through substantially a center part of the washing tank in an axial direction and in which a large number of water spray holes are formed at a place corresponding to a rear half portion of the washing tank;
a first wash water piping which is an outside pipe of a double pipe having the second wash water piping as an inside pipe and formed at a place corresponding to a front half portion of the washing tank, and includes a large number of water spray holes formed in an axial direction, the outside pipe and the inside pipe being coaxial and coextensive for a portion thereof; and
a piping system capable of supplying the ozonized water, the alkaline water and clean water to each of the second wash water piping and the first wash water piping by a changeover operation of valves,
wherein while at least one part of wash water sprayed from the first and the second wash water pipings is drained from the washing tank every rotation of the washing tank, washing of the food materials is performed.

42. A food washing apparatus as set forth in claim 41, comprising:
a front receiving tank for drain wash water from the front half portion of the washing tank;
a rear receiving tank for drain wash water from the rear-half portion of the washing tank; and
a piping system-for enabling the drain wash water in the rear receiving tank to be supplied to the first wash water piping,
wherein at least one part of wash water used in the rear half portion can be used as wash water of the front half portion.

43. A food washing apparatus as set forth in claim 41, comprising a piping system for enabling drain wash water in the front receiving tank or drain wash water in the rear receiving tank to be returned to the inlet side of the ozonized water generator, wherein at least one part of wash water drained from the washing tank is enabled to be used as materials water of the ozonized water generator.

44. A food washing apparatus as set-forth in claim 41, wherein the washing tank is constituted by coupling unit cylinders in each of which a spiral member is formed along an inner wall, to be separable in a longitudinal direction.

45. A food washing method for washing food materials such as food material stuffs to be eaten raw, grains, tubers, seeds, or nuts by using ozonized water, comprising:
placing food materials in from an inlet disposed at one end of a washing tank having a polygon shaped cross-section extending perpendicular to an axis of rotation of the washing tank, the food materials are drained from an outlet formed at the other end of the washing tank by rotating the washing tank;
spraying ozonized water from a wash water piping disposed in an axial direction in the washing tank, and draining the ozonized water by rotation of the washing tank from a drainage part formed on only one side of the polygon shaped cross-section of the washing tank and including an opening to such a degree that water passes through and the food materials do not pass through,
wherein while at least one part of the ozonized water sprayed from the wash water piping is drained from the drainage part of the washing tank every rotation of the washing tank, the food materials are washed and conveyed.

46. A food washing method as set forth in claim 45, wherein at least one part of the ozonized water drained from the washing tank is returned to a materials water inlet side of an ozonized water generator configured to supply the ozonized water to the wash water piping, and the ozonized water is cyclically used.

47. A food washing method as set forth in claim 45, wherein the wash water piping is constituted by a first wash water piping having a water spray hole in a front half portion of the washing tank and a second wash water piping having a water spray hole in a rear half portion of the washing tank, the ozonized water is ozonized water generated at an anode side by an electrolysis method of water, and one of the ozonized water, alkaline water generated at a cathode side by the electrolysis method, and clean water is enabled to flow through each of the first and the second wash water pipings by a changeover operation of valves.

48. A food washing method as set forth in claim 47, comprising the following processes:
- A process: "Before-washing process of washing tank" in which while the alkaline water generated at the cathode side by the electrolysis method or the clean water is sprayed from one of or both of the first and the second wash water pipings, before-washing of the washing tank itself is performed;
- B process: "food materials washing process" in which the food materials are put in from the inlet while the washing tank is rotated, and water spray of the ozonized water is performed from at least the second wash water piping, so that while at least one part of the sprayed ozonized water is drained every rotation of the washing tank, the food materials are conveyed in the washing tank, and washing and sterilization are performed; and
- C process: "After-washing process of washing tank" in which after completion of the food materials washing process, while the alkaline water or the clean water is sprayed from one of or both of the first and the second wash water pipings, after-washing of the washing tank itself is performed.

49. A food washing method as set forth in claim 48, wherein the A process comprises at least one of following A1 step to A3 step:
- A1 step: "Alkaline water before-washing step of washing tank" in which the alkaline water is supplied to both the first and the second wash water pipings to perform alkaline water washing of the washing tank;
- A2 step: "water before-washing step of washing tank" in which the clean water is supplied to both the first and the second wash water pipings to perform water washing of the washing tank; and
- A3 step: "alkaline water and water before-washing step of washing tank" in which the A2 step is performed after the A1 step is performed.

50. A food washing method as set forth in claim 48, wherein the B process comprises at least one of following B1 step to B3 step:
- B1 step: "Pre-washing and washing step of food materials" in which the clean water is sprayed from the first wash water piping in the front half portion of the washing tank, and the ozonized water is sprayed from the second wash water piping in the rear half portion of the washing tank;
- B2 step: "food materials degreasing and washing step" in which the alkaline water is sprayed from the first wash water piping in the front half portion of the washing tank, and the ozonized water is sprayed from the second wash water piping in the rear half portion of the washing tank; and
- B3 step: "food materials ozonized water washing step" in which the ozonized water is sprayed from the second wash water piping to the rear half portion of the washing tank, and the ozonized water is sprayed from the first wash water piping to the front half portion as well.

51. A food washing method as set forth in claim 50, wherein in the B3 step, the drain ozonized water sprayed from the second wash water piping to the rear half portion of the washing tank and drained from the rear half portion of the washing tank is supplied to the first wash water piping and is sprayed from the first wash water piping to the front half portion of the washing tank, so that recycle of the ozonized water is performed.

52. A food washing method as set forth in claim 48, wherein the C process, comprises at least one of following C1 step to C3 step:
- C1 step: "Alkaline water after-washing step of washing tank" in which the alkaline water is supplied to both the first and the second wash water pipings to perform alkaline water washing of the washing tank;
- C2 step: "Water after-washing step of washing tank" in which the clean water is supplied to both the first and the second wash water pipings to perform water washing of the washing tank; and
- C3 step: "Alkaline water and water after-washing step of washing tank" in which the C2 step is performed after the C1 step is performed.

53. A food washing method as set forth in claim 47, wherein the ozonized water drained from the front half portion of the washing tank is returned to the materials water inlet side of the ozonized water generator.

54. A food washing method as set forth in claim 47, wherein in at least one of the A process, the B process and the C process, at least one part of the wash water drained from the washing tank is returned to the materials water inlet part of the ozonized water generator.

55. A food washing method as set forth, in claim 45, wherein in a state where the sprayed wash water is stayed in the washing tank, a swing operation by rotation direction changeover is performed at least one time in which a rotation direction of the washing tank is reversed and is next normally rotated.

56. A food washing method as set forth in claim 55, wherein a rotation speed of the washing tank at a time of the swing operation is made faster than a rotation speed at a time of non-swing.

57. A food washing method as set forth in claim 45, wherein an inlet for the food materials is disposed at one end of the washing tank, a outlet for the food materials is formed at the other end, and a spiral member for conveying, with rotation of the washing tank, the food materials put-in the washing tank from a side of the inlet to the outlet is disposed on an inner wall surface of the washing tank.

* * * * *

UNITED STATES PATENT AND TRADEMARK OFFICE
CERTIFICATE OF CORRECTION

PATENT NO.        : 7,275,551 B2                                              Page 1 of 1
APPLICATION NO. : 10/258526
DATED             : October 2, 2007
INVENTOR(S)       : Kanaya et al.

It is certified that error appears in the above-identified patent and that said Letters Patent is hereby corrected as shown below:

On the title page, Item (30), the Foreign Application Priority Data information. Item (30) should read:

-- (30)           Foreign Application Priority Data

Apr. 25, 2000   (JP)   ……………………………… 2000-12891
    Feb. 02, 2001   (JP)   ………………………………..  2001-27057 --

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,275,551 B2 | Page 1 of 1 |
| APPLICATION NO. | : 10/258526 | |
| DATED | : October 2, 2007 | |
| INVENTOR(S) | : Kanaya et al. | |

It is certified that error appears in the above-identified patent and that said Letters Patent is hereby corrected as shown below:

On the title page, Item (30), the Foreign Application Priority Data information. Item (30) should read:

-- (30)    Foreign Application Priority Data

Apr. 25, 2000   (JP)   ................................ 2000-128981
    Feb. 02, 2001   (JP)   ................................ 2001-27057 --

This certificate supersedes the Certificate of Correction issued December 11, 2007.

Signed and Sealed this

Sixteenth Day of September, 2008

JON W. DUDAS
*Director of the United States Patent and Trademark Office*